(12) United States Patent
Tanizaki et al.

(10) Patent No.: US 6,295,066 B1
(45) Date of Patent: Sep. 25, 2001

(54) METHOD FOR GENERATING VIRTUAL THREE-DIMENSIONAL SPACE

(75) Inventors: Masaaki Tanizaki, Kodaira; Kishiko Maruyama, Kokubunji; Shigeru Shimada, Kodaira; Nobuya Okayama, Kawasaki; Akira Ishii, Yokohama, all of (JP)

(73) Assignees: Hitachi, Ltd., Tokyo; Hitachi Software Engineering Co., Ltd., Yokohama, both of (JP)

( * ) Notice: Subject to any disclaimer, the term of this patent is extended or adjusted under 35 U.S.C. 154(b) by 0 days.

(21) Appl. No.: 09/150,236

(22) Filed: Sep. 10, 1998

(30) Foreign Application Priority Data

Sep. 12, 1997 (JP) .................................................. 9-248171
Sep. 12, 1997 (JP) .................................................. 9-267817

(51) Int. Cl.[7] .................................................. G06T 17/00
(52) U.S. Cl. .................................................. 345/419; 345/427
(58) Field of Search .................................................. 345/418, 419, 345/420, 425, 426, 427, 429

(56) References Cited

U.S. PATENT DOCUMENTS

| 5,808,620 | * | 9/1998 | Doi et al. ........................... 345/426 |
| 5,917,495 | * | 6/1999 | Doi et al. ........................... 345/419 |
| 5,982,377 | * | 11/1999 | Yamashita et al. ................. 345/427 |
| 6,226,000 | * | 5/2001 | Richens et al. ..................... 345/419 |

* cited by examiner

Primary Examiner—Cliff N. Vo
(74) Attorney, Agent, or Firm—Antonelli, Terry, Stout & Kraus, LLP

(57) ABSTRACT

A plurality of rough three-dimensional structured data, each expressing a shape of an object in a polygon pillar, are displayed on a display unit; one rough three-dimensional structured data is selected from the plurality of rough three-dimensional structured data displayed on the display unit in accordance with a request given by an input device; a detailed three-dimensional structured data corresponding to the selected rough three-dimensional structured data is retrieved from a set of detailed three-dimensional structured data which are stored in a storage unit and each of which expresses a shape of an object in detail; and the selected rough three-dimensional structured data is replaced by the corresponding detailed three-dimensional structured data.

20 Claims, 24 Drawing Sheets

EXAMPLE OF STRUCTURED DATA MANAGEMENT TABLE 900

| NAME | NUMBER OF FLOORS | SHAPE OF BOTTOM SURFACE | AREA OF BOTTOM SURFACE | DATA FORMAT | DIRECTORY/FILE-NAME |
|---|---|---|---|---|---|
| SECOND HOTEL | 7 | {0, 0.5,...0} | 55000 | DATA FORMAT A | /data/hotel_2 |
| ROUND BUILDING | 10 | {0, 0.8,...0} | 33000 | DATA FORMAT B | /data/building_A |
| HOTEL ABC | 7 | {0, 0.3,...0} | 45000 | DATA FORMAT C | /data/hotel_ABC |
| ... | ... | ... | ... | ... | ... |

901 SECOND HOTEL
902 ROUND BUILDING
903 HOTEL ABC

FIG.23

EXAMPLE OF VIRTUAL THREE-DIMENSIONAL
SPACE DATA STORAGE TABLE

2300

| FIGURE ID | DIRECTORY/FILE-NAME | ARRANGEMENT:{X,Y,Z} | ROTATION:{X,Y,Z} |
|---|---|---|---|
| 2 | /data/hotel_2 | {124, 233, 0} | {90, 0, 0} |
| 7 | /data/building_A | {25, 33, 10} | {0, 90, 0} |
| 9 | /data/hotel_ABC | {55, 200, 0} | {90, 0, 0} |
| ... | ... | ... | ... |

METHOD FOR GENERATING VIRTUAL THREE-DIMENSIONAL SPACE

BACKGROUND OF THE INVENTION

The present invention relates to a method for generating virtual three-dimensional space and particularly to a method for generating virtual three-dimensional space from rough three-dimensional structured data generated on the basis of two-dimensional space data of a residence map, or the like, for expressing the shape of a subject in polygonal pillars and detailed three-dimensional structured data interactively generated on the basis of detailed information of a design drawing, or the like, for expressing the shape of the subject in detail.

In a space information providing system such as a map/drawing information system, the retrieval of information pertinent to positions such as route guidance, facility management, etc. is required. Accordingly, it is effective to use a method for retrieving an object while walking through virtual three-dimensional space constructed on a computer on the basis of actual city space to thereby refer to pertinent information on the basis of links from the object. To achieve such a system, it is necessary to construct virtual three-dimensional space which reflects actual city space and which can be put into practical use. Roughly, there are two methods for constructing such virtual three-dimensional space. One is a method in which detailed three-dimensional structured data are generated interactively by use of a CAD tool, or the like.

The other is a method in which rough three-dimensional structured data for expressing a subject in polygonal pillars are generated automatically from two-dimensional map data, or the like, and from building floor number information, or the like, associated with respective two-dimensional figures. This method will be described below with reference to FIG. 3. Using two-dimensional space data 301 expressing vector information and attribute data 302 of building floor number, or the like, associated with the two-dimensional space data, the total height of each building is calculated on the assumption of the height per floor so that polygonal pillars each having upper and lower surfaces formed on the basis of a building frame are generated. Structured data 303 are rough three-dimensional structured data generated by this method automatically. Incidentally, this method is described in Japanese Patent Application 8-118661 which is not opened yet. A method similar to this method is disclosed in JP-A-4-149681. JP-A-4-149681 discloses the fact that all Z ordinates of constituent points of each map element are not held correspondingly to the constituent points but one Z ordinate value is extracted correspondingly to each map element and held as height information to thereby reduce the quantity of three-dimensional data, and the fact that three-dimensional map data are generated on the basis of a two-dimensional map data file for holding coordinate values of constituent points of each map element displayed on a map and the height of each building as a map element held in an attribute data file for holding attribute information pertinent to each map element displayed on a map.

There is however a problem that enormous time and labor is required in the method of interactively generating all structured data by use of a CAD tool, or the like, to construct virtual three-dimensional space. Although it is necessary that the quantity of data for virtual three-dimensional space is reduced as sufficiently as possible for the purpose of providing information through the Internet, this requirement cannot be satisfied if all structured data on the virtual three-dimensional space are interactively generated by use of a CAD tool, or the like.

On the other hand, according to the method in which rough three-dimensional structured data are generated automatically on the basis of two-dimensional map data, or the like, and on the basis of building floor number information, or the like, associated with respective two-dimensional figures, three-dimensional structured data can be generated from wide-range two-dimensional map data in a short time and on the basis of a smaller quantity of data. In this method, however, each building is often difficult to be understood as an object of navigation because all buildings are expressed in polygonal pillars.

To eliminate the difficulty of understanding each building as an object of navigation, therefore, it is thought of that only landmarks, or the like, allowed to be used as objects among the automatically generated rough structured data are selectively replaced by detailed structured data interactively generated by use of a CAD tool, or the like. FIG. 28 shows a flow of manual work for composing virtual three-dimensional space. In FIG. 28, the reference numeral 2801 designates virtual three-dimensional space expressed by rough three-dimensional structured data generated automatically; and 2802, detailed three-dimensional structured data generated interactively by use of a CAD tool, or the like. In a procedure 2803 for composing virtual three-dimensional space, the scale, parallel movement and rotation of the structured data are changed manually to thereby align rough three-dimensional structured data as a subject of replacement and detailed three-dimensional structured data to be substituted for the rough three-dimensional structured data. Thus, data on the automatically generated virtual three-dimensional space are partly replaced by detailed three-dimensional structured data. The reference numeral 2804 designates virtual three-dimensional space data composed in the aforementioned manner.

Much labor is, however, required for the alignment because a coordinate system for the detailed structured data generated interactively by use of a CAD tool, or the like, is not always accordant with a coordinate system for the rough virtual three-dimensional space generated automatically. Furthermore, because the flexibility in parallel movement, rotation, or the like, for the alignment in three-dimensional space is high, much manual work is required for composing virtual three-dimensional space from rough structured data and detailed structured data even in the case where only landmarks, or the like, allowed to be used as objects are selectively replaced by detailed structured data generated interactively by use of a CAD tool, or the like. Consequently, enormous labor is required.

SUMMARY OF THE INVENTION

An object of the present invention is to provide a method for generating virtual three-dimensional space inexpensively through partly replacing a plurality of rough three-dimensional structured data by detailed three-dimensional structured data.

In order to achieve the above object, according to an aspect of the present invention, provided is a method for generating virtual three-dimensional space, comprising the steps of: displaying a plurality of rough three-dimensional structured data, each expressing a shape of an object in a polygon pillar, on a display unit; selecting one rough three-dimensional structured data from the plurality of rough three-dimensional structured data displayed on the display unit in accordance with a request given by an input device; retrieving a detailed three-dimensional structured data corresponding to the selected rough three-dimensional structured data from a set of detailed three-dimensional structured data which are stored in a storage unit and each of which expresses a shape of an object in detail; and replacing the selected rough three-dimensional structured data by the corresponding detailed three-dimensional structured data.

According to another aspect of the present invention, provided is a method for generating virtual three-dimensional space, comprising the steps of: displaying two-dimensional space data expressing a plurality of objects in two-dimensional shapes on a display unit; selecting one object from the two-dimensional space data displayed on the display unit in accordance with a request given by an input device; retrieving a detailed three-dimensional structured data corresponding to a two-dimensional shape of the selected object from a set of detailed three-dimensional structured data which are stored in a storage unit and each of which expresses a shape of an object in detail; and replacing the selected object by the corresponding detailed three-dimensional structured data.

According to a further aspect of the present invention, provided is a method for generating virtual three-dimensional space, comprising the steps of: converting detailed three-dimensional structured data, each of which expresses a shape of an object in detail, into two-dimensional figure data; retrieving an object having a shape analogous to a shape of the thus obtained two-dimensional figure data from two-dimensional space data expressing a plurality of objects in two-dimensional shapes; and arranging the detailed three-dimensional structured data in a region in which the extracted object is displayed.

According to a still further aspect of the present invention, provided is a computer readable memory medium storing a program for generating virtual three-dimensional space, the program comprising the steps of: displaying a plurality of rough three-dimensional structured data, each expressing the shape of an object in a polygon pillar, on a display unit; selecting one rough three-dimensional structured data from the plurality of rough three-dimensional structured data displayed on the display unit in accordance with a request given by an input device; retrieving a detailed three-dimensional structured data corresponding to the selected rough three-dimensional structured data from a set of detailed three-dimensional structured data which are stored in a storage unit and each of which expresses a shape of an object in detail; and replacing the selected rough three-dimensional structured data by the corresponding detailed three-dimensional structured data.

According to another aspect of the present invention, provided is a method for transmitting virtual three-dimensional structured data from a server to a terminal device via a network, comprising the steps of: receiving a retrieval request and a retrieval condition from the terminal device for retrieving detailed three-dimensional structured data expressing a shape of an object in detail correspondingly to rough three-dimensional structured data expressing a shape of an object in a polygon pillar; retrieving a set of detailed three-dimensional structured data, which are stored in a storage unit and each of which expresses a shape of an object in detail, in accordance with the retrieval condition; and transmitting the detailed three-dimensional structured data in accordance with the retrieval condition to the terminal device.

According to a further aspect of the present invention, provided is a method for generating virtual three-dimensional space at a terminal device with communicating with a server, comprising the steps of: displaying a plurality of rough three-dimensional structured data, each expressing the shape of an object in a polygonal pillar, on a display unit in the terminal device; selecting one rough three-dimensional structured data from the plurality of rough three-dimensional structured data displayed on the display unit in the terminal device; transmitting a retrieval condition from the terminal device to the server to retrieve detailed three-dimensional structured data expressing a shape of an object in detail correspondingly to the selected rough three-dimensional structure data; retrieving a set of detailed three-dimensional structured data, which are stored in a storage unit in the server and each of which expresses a shape of an object in detail, in the server in accordance with the retrieval condition; transmitting the detailed three-dimensional structured data from the server to the terminal device, in accordance with the retrieval condition; and replacing the selected rough three-dimensional structured data by the detailed three-dimensional structured data transmitted from the server, in the terminal device.

Other features of the present invention will become clear from the following description of embodiments of the invention.

BRIEF DESCRIPTION OF THE DRAWINGS

FIG. 23 is a view showing an example of a virtual three-dimensional space data storage table;

DESCRIPTION OF THE PREFERRED EMBODIMENTS

Figure 3:
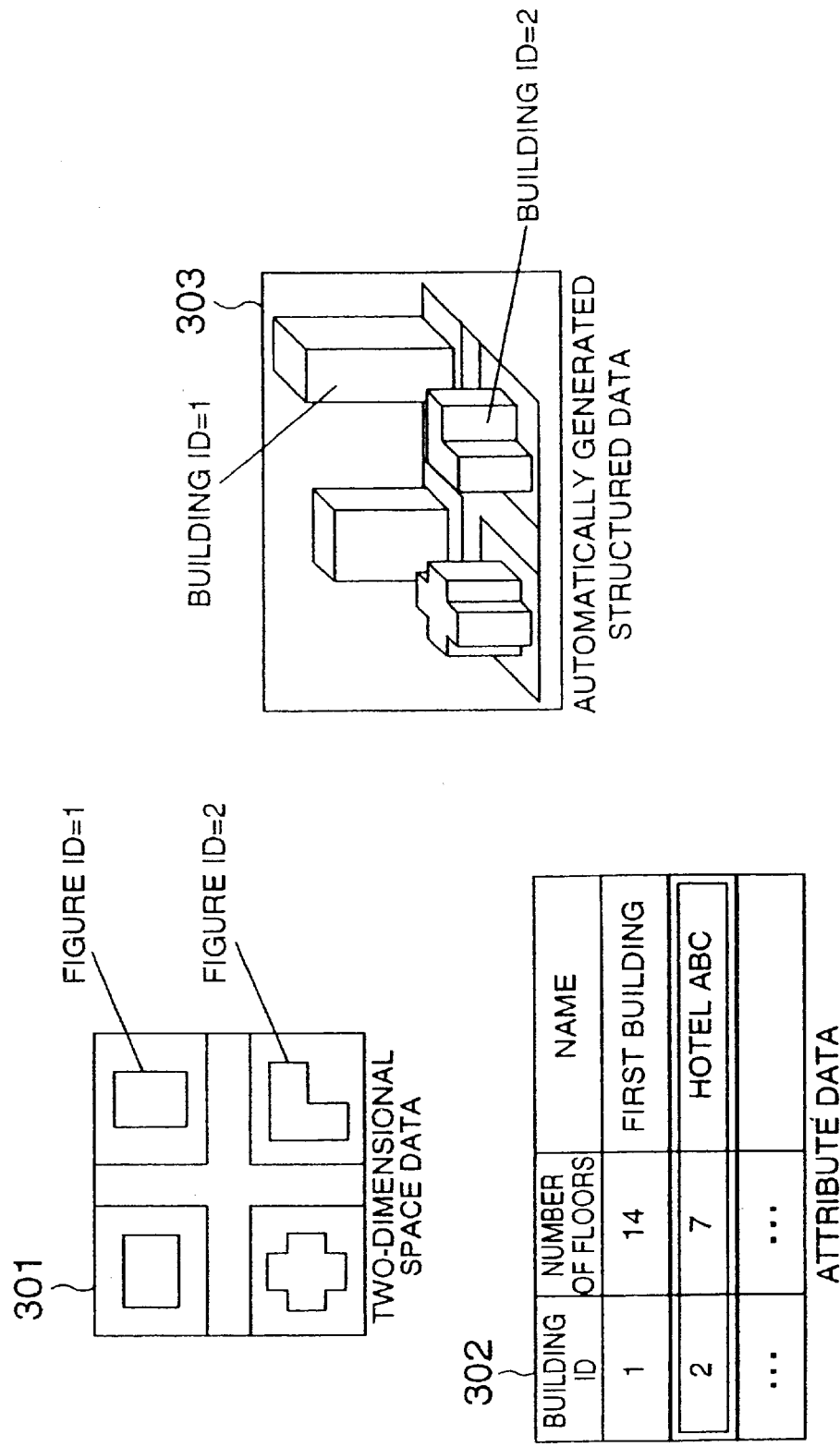
FIG. 3 is a diagram for explaining a method for automatically generating structured data.

Embodiments of the present invention will be described below. In the following description of embodiments, structured data automatically generated by the method described above with reference to FIG. 3 are used as rough three-dimensional structured data. In the following description, rough three-dimensional structured data are referred to as "automatically generated structured data" and detailed three-dimensional structured data are referred to as "interactively generated structured data".

EMBODIMENT 1

Figure 1:
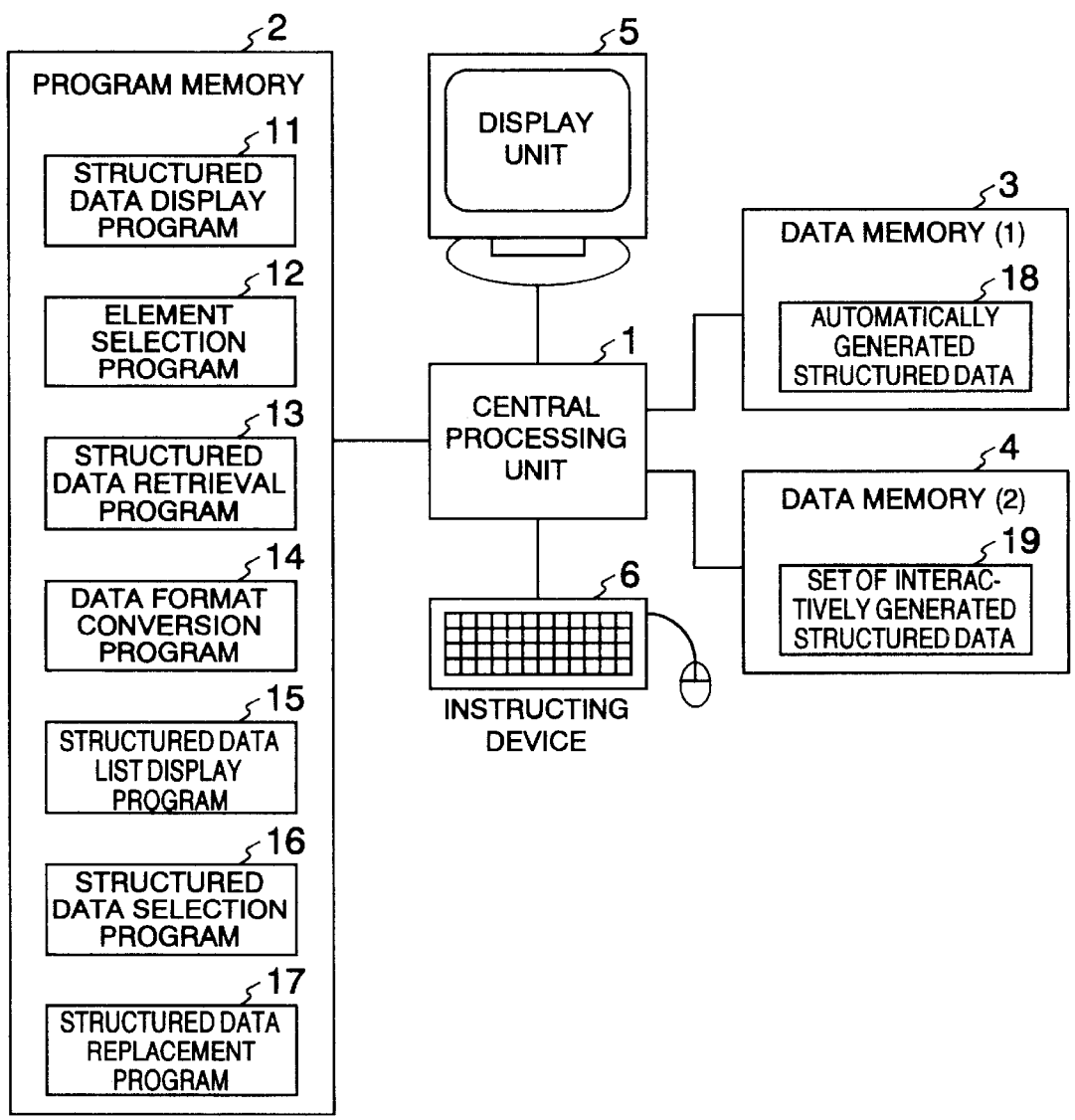
FIG. 1 is a diagram showing a system configuration for constructing virtual three-dimensional space according to the present invention.

FIG. 1 is a diagram showing a system configuration for constructing virtual three-dimensional space according to the present invention.

In FIG. 1, the reference numeral 1 designates a central processing unit (hereinafter referred to as "CPU") for constructing virtual space; and 2, a program memory for storing programs necessary for processing in the CPU. A structured data display program 11 for displaying automatically generated structured data, an element selection program 12 for selecting replacement elements from the automatically generated structured data, a structured data retrieval program 13 for retrieving interactively generated structured data as substitutive candidates, a data format conversion program 14 for converting the data format of the retrieved structured data into the data format of the automatically generated structured data, a structured data list display program 15 for displaying a list of the retrieved structured data, a structured data selection program 16 for selecting structured data to be substituted and a structured data replacement program 17 for replacing structured data are stored in the program memory 2. The reference numeral 3 designates a first data memory for storing automatically generated structured data 18; and 4, a second data memory for storing a set of interactively generated structured data 19.

Here, the set of interactively generated structured data 19 used as substitutive candidates are a set of detailed three-dimensional building structured data which are generated interactively by use of a CAD tool, or the like. The prerequisite for data formats expressing structured data is in that not only figure elements such as points, lines, planes, etc. can be expressed on the three-dimensional space but also a plurality of figure elements can be grouped. As one of such data formats, for example, a three-dimensional solid description language VRML (virtual reality modeling language) standardized by ISO/IEC 14772 can be used. The reference numeral 5 designates a display means for displaying automatically generated and interactively generated structured data and displaying the progress of an operation; and 6, an instructing means for giving an instruction to select one from a plurality of candidates.

A flow of replacement in the virtual three-dimensional space constructing system according to the present invention, that is, an example of an operation for replacing building elements of automatically generated structured data by building structured data interactively generated by use of a CAD tool, or the like, will be described with reference to FIG. 2.

Figure 2:
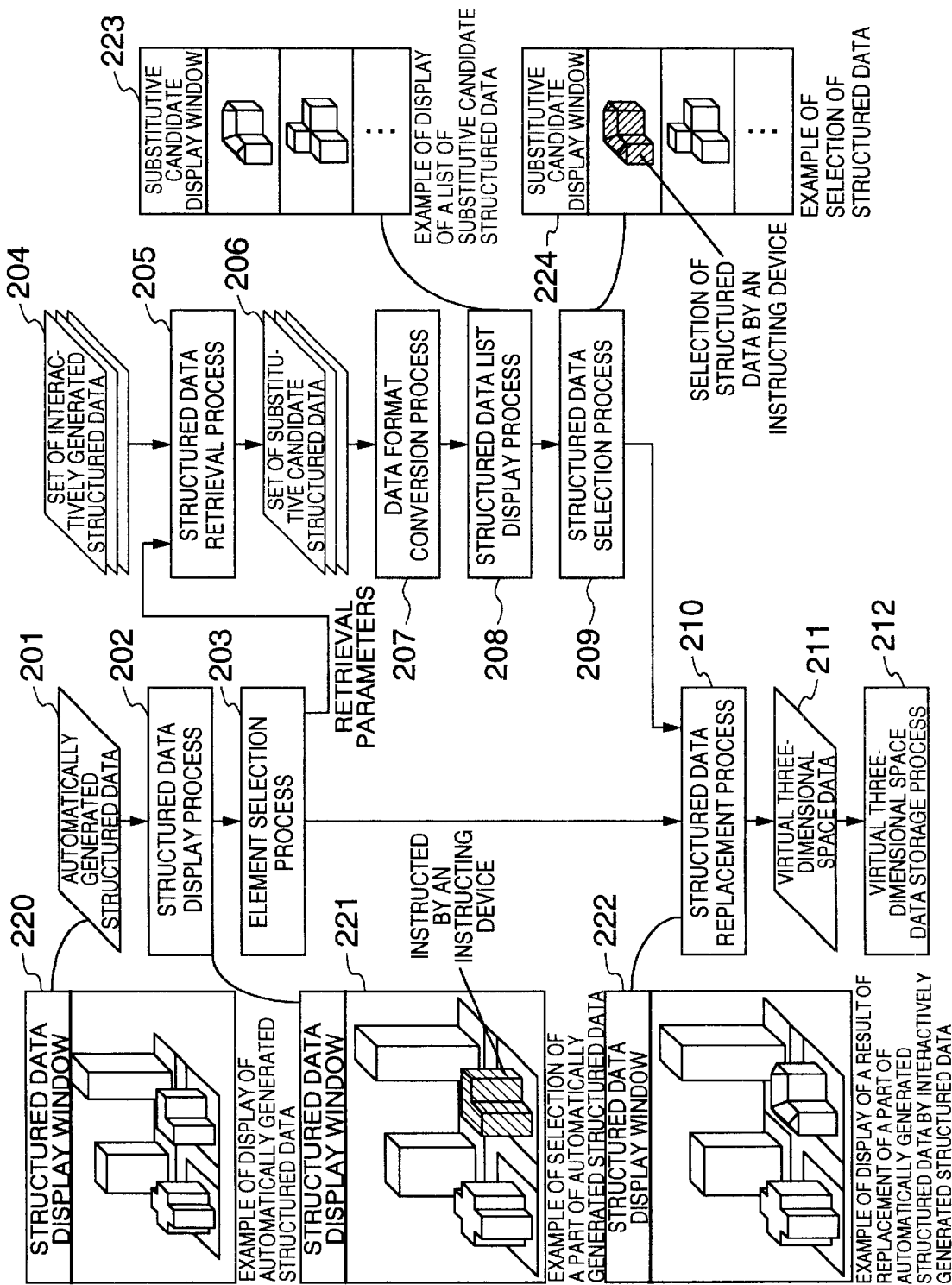
FIG. 2 is a flow chart showing a method for constructing virtual three-dimensional space according to the present invention.

FIG. 2 is a diagram showing a flow of work for constructing virtual three-dimensional space from automatically generated structured data and interactively generated structured data according to the present invention. In FIG. 2, the reference numeral 201 designates automatically generated structured data; 204, a set of interactively generated structured data as subjects of retrieval; 206, a set of structured data retrieved as substitutive candidates; and 211, virtual three-dimensional space data obtained as a result of the replacement. The reference numerals 202, 203, 205, 207, 208, 209, 210 and 212 designates respective processes in the construction of the virtual three-dimensional space. The reference numerals 220, 221, 222, 223 and 224 designate an example of display in a structured data display window and a substitutive candidate display window in which data are displayed on a display unit in a PC, an UNIX, or the like. The processes will be described below in order of the example of display.

The structured data display window designated by the reference numeral 220 shows the case where the automatically generated structured data 201 are displayed as a result of the structured data display process designated by the reference numeral 202. The automatically generated structured data 201 are structured data generated automatically from two-dimensional space data 301 and attribute data 302 in FIG. 3. Solid elements expressing buildings are grouped into a plurality of surfaces such as upper surfaces, lower surfaces, wall surfaces, etc., so that the solid elements have IDs respectively. In the structured data display process 202 for displaying the structured data 201 on a screen, three-dimensional structured data are processed by a perspective translation process, a hidden surface removal process, or the like, as known commonly, for example, to generate pixel information in accordance with figure elements on a display screen and display the pixel information on a display unit.

The structured data display window designated by the reference numeral 221 shows the case where at least one building element is selected from the automatically generated structured data by an operator through an instructing device such as a mouse in the element selection process 203 so that the selected building element is displayed after the color of the selected building element is changed. In the element selection process 203, a parameter for retrieving interactively generated structured data to be substituted for the selected element is acquired on the basis of the ID of the selected element and delivered to the structured data retrieval process 205. Any one of the name of the selected element, the number of floors, the shape of the bottom surface and the area of the bottom surface is selected as the retrieval parameter.

The substitutive candidate display window designated by the reference numeral 223 shows a result in which a list of structured data suitable as substitutive candidates among the set of interactively generated structured data 204 are displayed. The structured data 204 are a set of structured data which are generated interactively by use of a structured data generating tool such as a CAD, or the like, in advance. In the structured data retrieval process 205, a set of structured data 206 suitable as substitutive candidates among the set of structured data 204 are acquired on the basis of the retrieval parameter obtained by the process 203. Succeedingly, in the data format conversion process 207, the data format of the retrieved structured data 206 is made accordant with the data format of the automatically generated structured data 201. In the structured data list display process 208, a list of these structured data are displayed in order of the degree of likeness in the shape of the bottom surface. Further, when the respective structured data are displayed, the direction of view for substitutive candidates in the substitutive candidate display window is made coincident with the direction of view for the selected element in the structured data display window on the basis of the shape of the bottom surface. When the direction of display in the structured data display window 221 is changed, the change is reflected in the respective structured data display in the substitutive candidate display window 223 so that the direction of display in the substitutive candidate display window is always interlocked with the direction of display in the structured data display window. The substitutive candidate display window 223 is shown as an example of such interlocked display.

Figure 17:
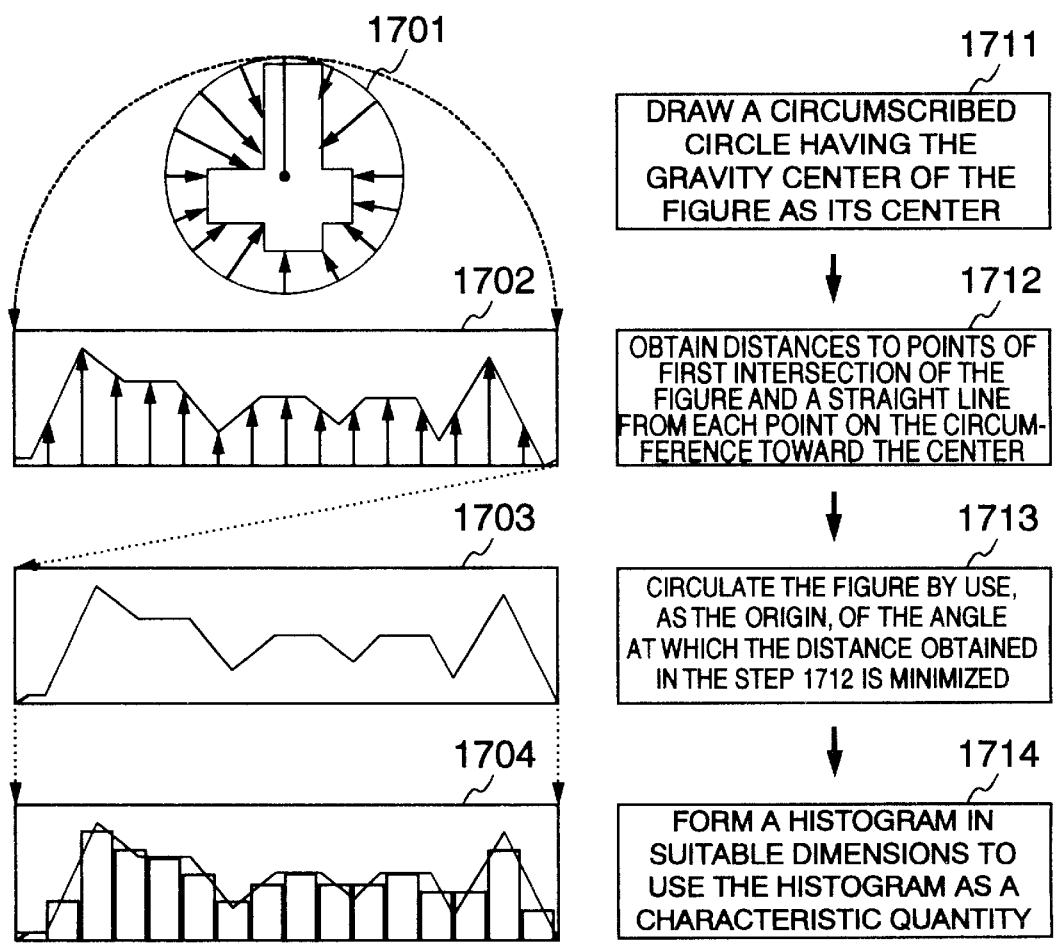
FIG. 17 is a view for explaining the characteristic quantity in the form of a figure.

The definition of the degree of likeness in the shape of the bottom surface will be described below. For example, definition proposed in Paper by Akama et al, "Image Retrieval System based on Automatic In-image-object Extraction" (Proceedings of the 8th Data Engineers Workshop (DEWS'97), Institute of Electronics, Information and Communication Engineers of Japan, pp. 107–112) is used as the definition of the degree of likeness. FIG. 17 is a view showing a flow of work for calculating the characteristic quantity of a figure in the above-mentioned literature. First, in a step 1711, a circumscribed circle having the center of gravity of the figure as its center is drawn as represented by the reference numeral 1701. Then, in a step 1712, a straight line is drawn from each point on the circumference toward the center and the distance from the point on the circumference to a point of first intersection of the figure and the straight line is obtained while the angle is changed as represented by the reference numeral 1702. In a step 1713, the figure is circulated as represented by the reference numeral 1703 with use of the angle minimizing this distance as its origin. In a step 1714, a histogram based on suitable dimensions as represented by the reference numeral 1704 is obtained as the characteristic quantity of the figure. The thus obtained distance in characteristic quantity space is defined as the degree of likeness between two figures.

The substitutive candidate display window 224 shows a result in which an operator selects one structured data by using the instructing means in the structured data selection process 209. The selected structured data is delivered to the following structured data replacement process 210.

Referring back to FIG. 2, the structured data display window 222 shows an example of display of a result of the structured data replacement process 210. This example shows the case where the building element selected in the element selection process 203 is replaced by the structured data selected in the structured data selection process 209. As a result, virtual three-dimensional space data constructed from automatically generated structured data and interactively generated structured data are obtained. Finally, in the virtual three-dimensional space data storage process, the ID of the element selected in the element selection process 203, location information indicating the storage position of interactively generated data and arrangement information in automatically generated structured data are stored as virtual three-dimensional space data obtained as a result of the aforementioned series of processes. Accordingly, when virtual three-dimensional space data in the same region are to be displayed again after that, the same processing need not be repeated.

Steps of the process in FIG. 2 will be described in detail.

Figure 4:
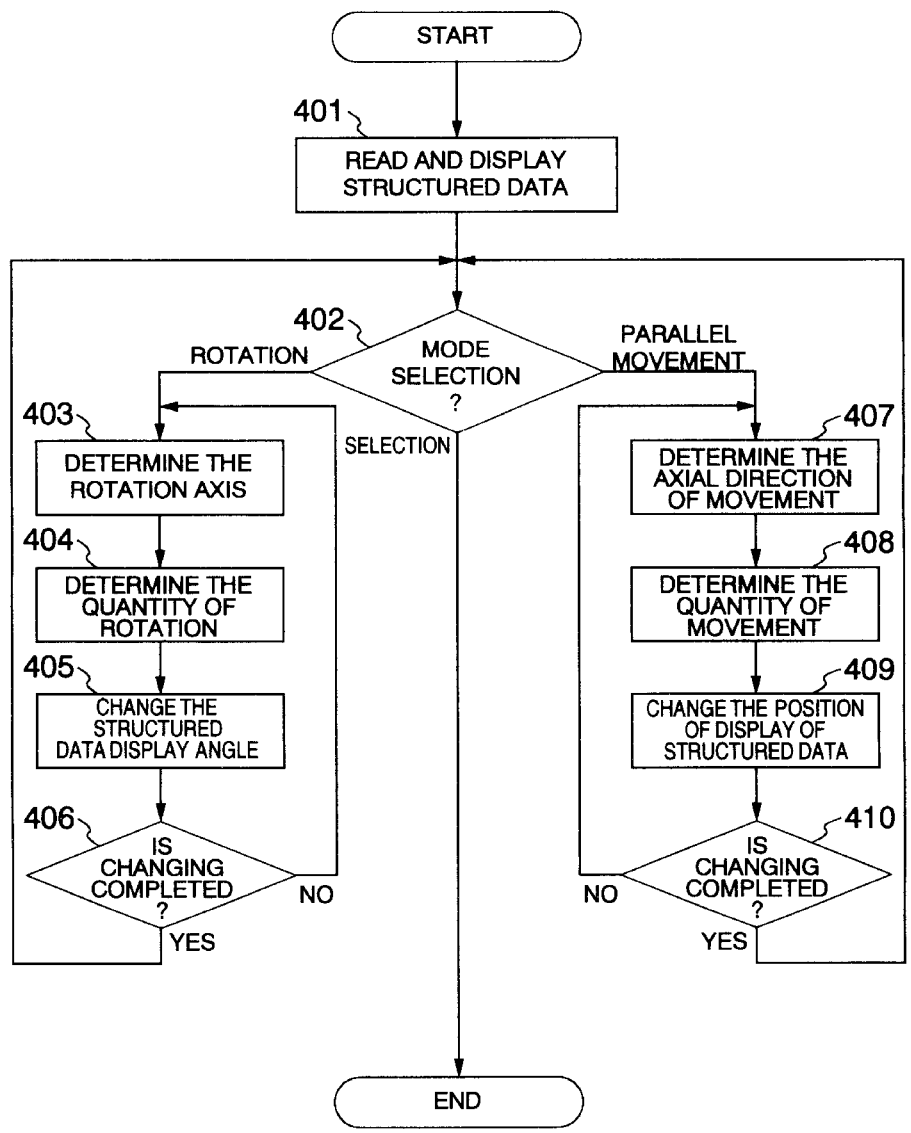
FIG. 4 is a flow chart of a procedure for displaying the automatically generated structured data.
Figure 5:
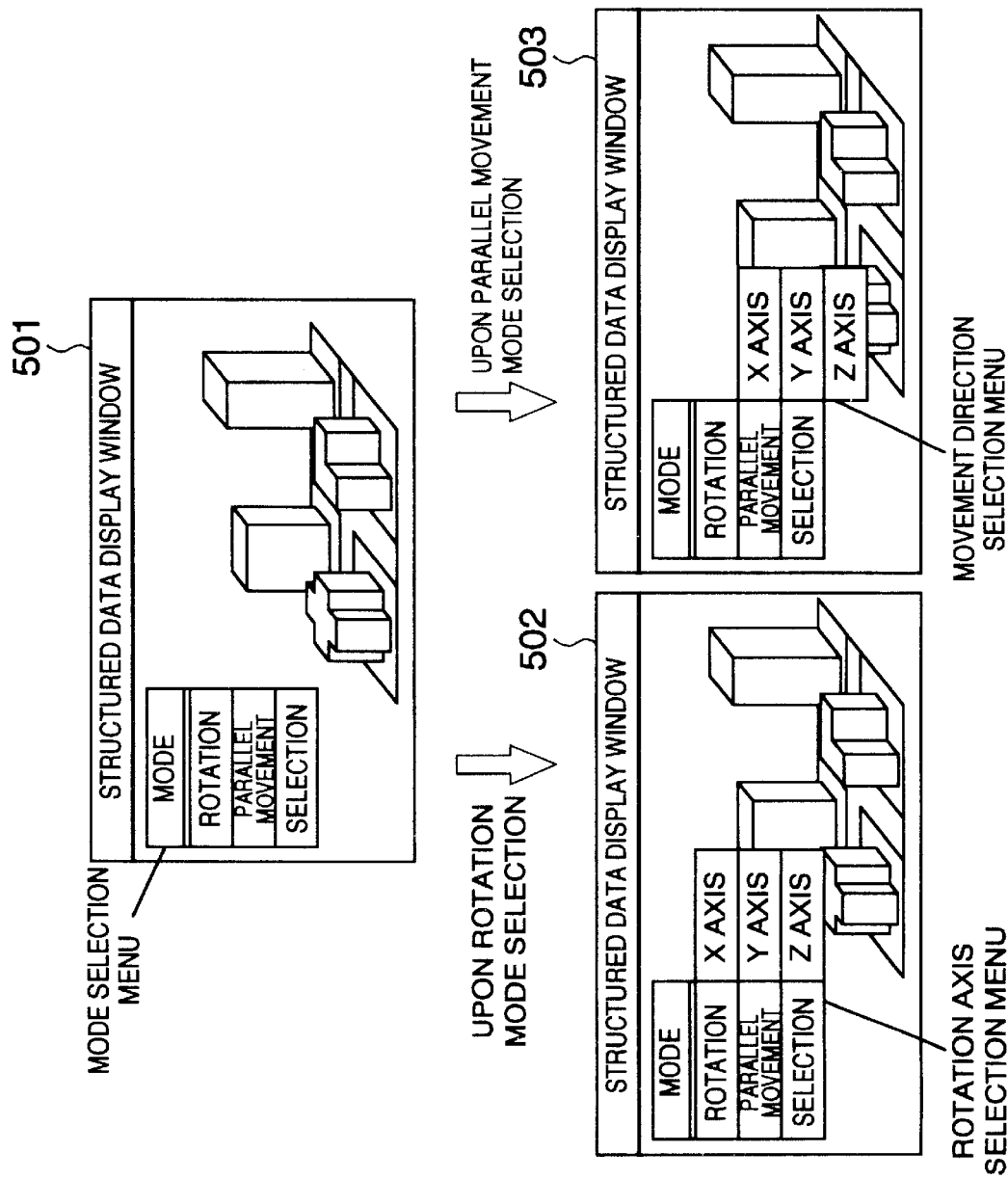
FIG. 5 is a diagram for explaining the change of a display mode in a structured data display window.

First, a flow of work for performing a parallel movement or rotation operation to display an element to be replaced in a suitable position in the structured data display process 202 will be described. FIG. 4 is a flow chart showing the structured data display process. In FIG. 4, the reference numerals 401 to 410 designate steps for carrying out a parallel movement or rotation operation. The reference numerals 501 to 503 in FIG. 5 show examples of the menu displayed in the structured data display window on a screen by each process. In the step 401, the structured data generated automatically is read so as to be drawn in the structured data display window. In the mode selection 402, a mode selection menu as represented by the reference numeral 501 is displayed in the structured data display window by an instructing means, that is, for example by an operation of pushing the left button of a mouse as the instructing means. For example, here, by using the right button of the mouse as the instructing means, an instruction is given to select one of the two modes of rotation and parallel movement. When rotation is selected, one of the three axes X, Y and Z is determined as the rotation axis in the rotation axis determination step 403. This determination is made based on an instruction which is given, for example, through the left button of the mouse as the instructing means on the rotation axis selection menu 502. Next, in the rotation quantity determination step 404, the quantity of rotation is determined. For example, the display is rotated clockwise by 10° in the step 405 whenever the right button of the mouse as the instructing means is pushed, and the display is rotated counterclockwise by 100 in the step 405 whenever the left button of the mouse as the instructing device is pushed. In the change termination step 406, for example, the Enter key and the Escape key as the instructing means are used for Yes and No respectively so that rotation around each of the X, Y and Z axes is repeated by a necessary number of times to change the display of the structured data. With respect to parallel movement, the display of the structured data is changed in the same manner as in the case of rotation. That is, the direction of movement is selected by the instructing means on the movement direction selection menu 503. The quantity of movement is determined by the instructing means in the step 408. Movement in the direction parallel with each of the X, Y and Z axes is repeated by a necessary number of times to change the display of the structured data. When the display of the structured data in a suitable position is completed by rotation and parallel movement in the window, selection for leading the mode to the following element selection process is instructed in the mode selection step 402 to terminate this process. As a result, the structured data is displayed in a position in the structured data display window where the operator requires.

Figure 6:
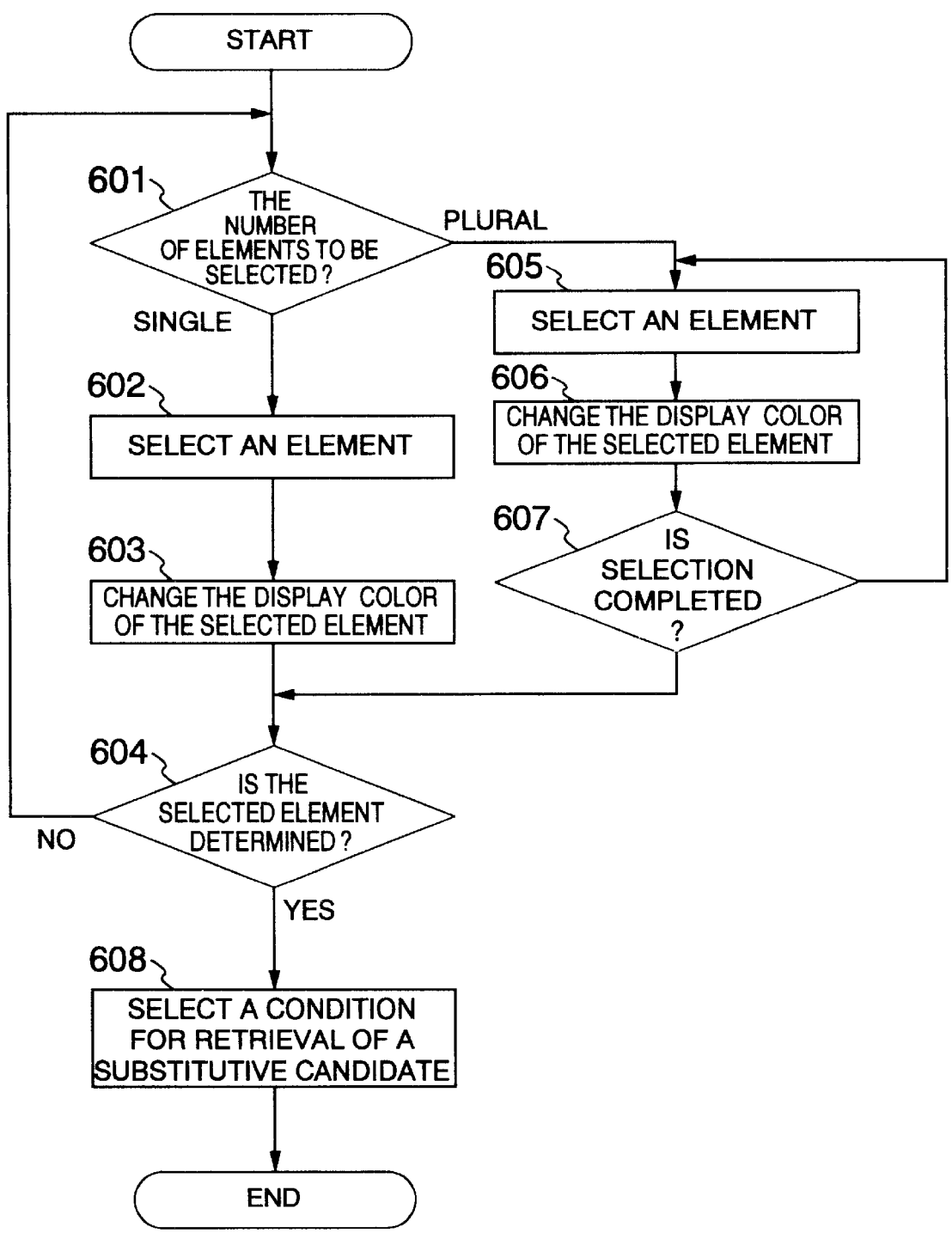
FIG. 6 is a flow chart for explaining a procedure for selecting replacement elements from the automatically generated structured data.
Figure 7:
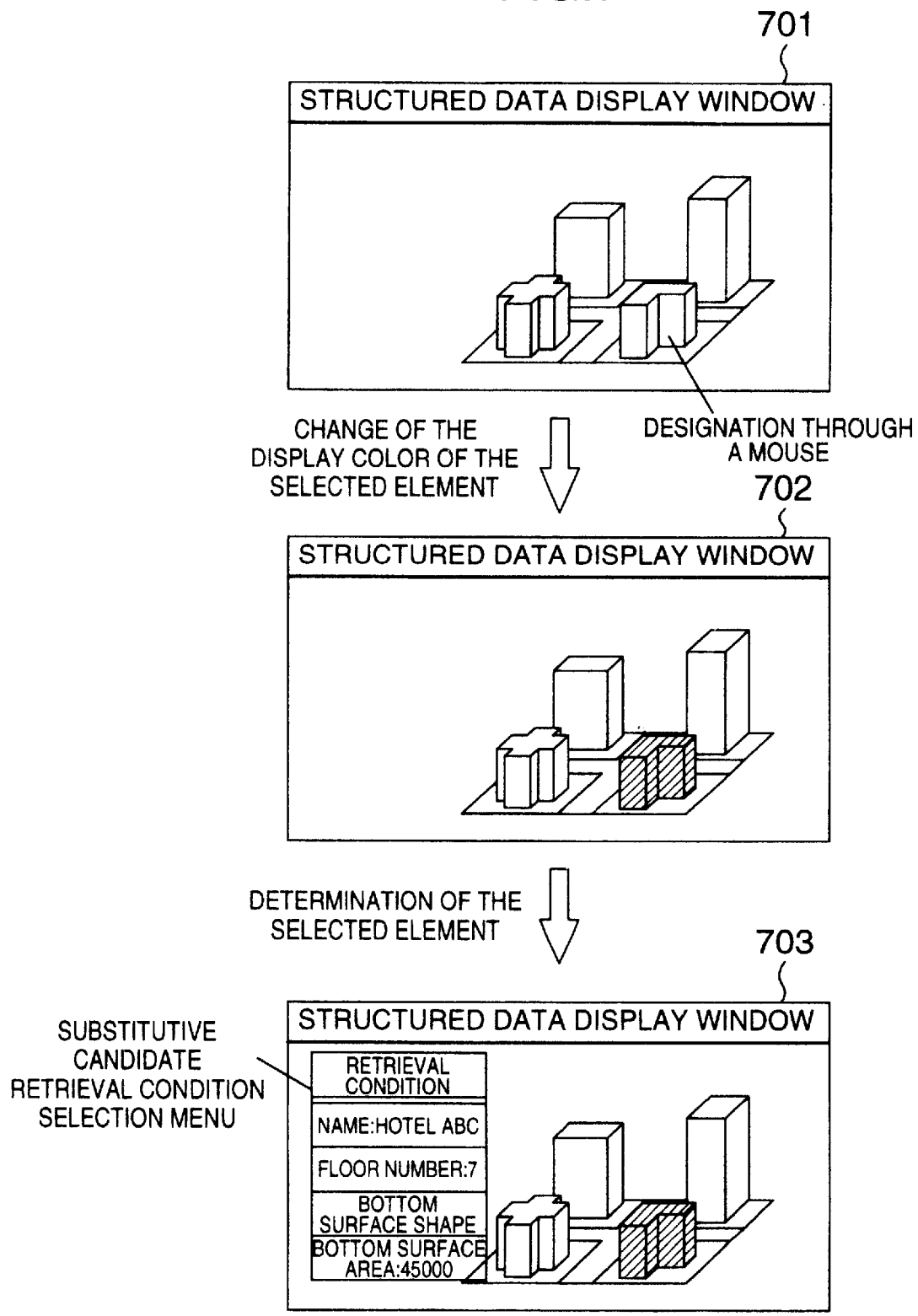
FIG. 7 is a diagram for explaining a procedure for selecting replacement elements on the structured data display window.

Next, the element selection process 203 will be described below with reference to FIGS. 6 and 7. FIG. 6 is a flow chart for explaining the element selection process. In FIG. 6, the reference numerals 601 to 608 designate steps for selecting elements to be replaced in the structured data display window. The reference numerals 701 to 703 in FIG. 7 show examples of display in the structured data display window as results of the respective steps. When a plurality of elements are to be selected in the step 601 of selecting the number of elements in the element selection process, for example, the Shift key as an instructing means is pushed continuously. When one element is to be selected in the step 601, no key is pushed before the situation of the process goes to the next step. In the element selection step 602, a building element is selected by an instruction through the mouse as shown in the structured data display window 701 in FIG. 7. Next, in the selected element display color changing step 603, the display color of the building element is changed. When, for example, the display color of each surface of the building element is expressed by red, green and blue values (R_org, G_org, B_org) in which each of the values is in a range of from 0 to 255, the changed display color (R, G, B) is changed to a display color given by (R, G, B)=(255-R_org, 255-G_org, 255-B_org). As a result, the display color of the selected element is changed as shown in the structured data display window 702 in FIG. 7.

In the case where a plurality of elements are to be selected in the step 601, the plurality of elements can be selected by repetition of the steps 605 and 606. In this case, the situation of the process goes to the selection end step 607 when the Shift key is released. Next, in the step 604, the elements which have been already selected are determined when the Enter key is pushed, and element selection is tried again when the Escape key is pushed. When element selection is to be tried again, the selection process is repeated. When the selected elements are determined, the situation of the process goes to the substitutive candidate retrieval condition selection step 608. In this step, a menu for selection of a condition for retrieval of a substitutive candidate is displayed in the structured data display window 703, so that a retrieval condition is selected by the instructing means such as a mouse. In this occasion, when one element is selected in the step 601, the name, the number of floors, the shape of the bottom surface and the area of the bottom surface obtained on the basis of the ID of the selected element are used as default values of retrieval parameters. On the contrary, when a plurality of elements is selected in the step 601, the maximum value of the number of floors in the selected elements, the outermost polygonal shape of the bottom surface in the selected elements and the area of the bottom surface having the outermost polygonal shape are used as default values of retrieval parameters. In the case where the values of the parameters are to be changed, corresponding values in the substitutive candidate retrieval condition selection menu in the structured data display window 703 are mended through a keyboard. Incidentally, the shape of the bottom surface will be described later. By the aforementioned process, elements to be replaced are selected from automatically generated structured data.

Figure 8:
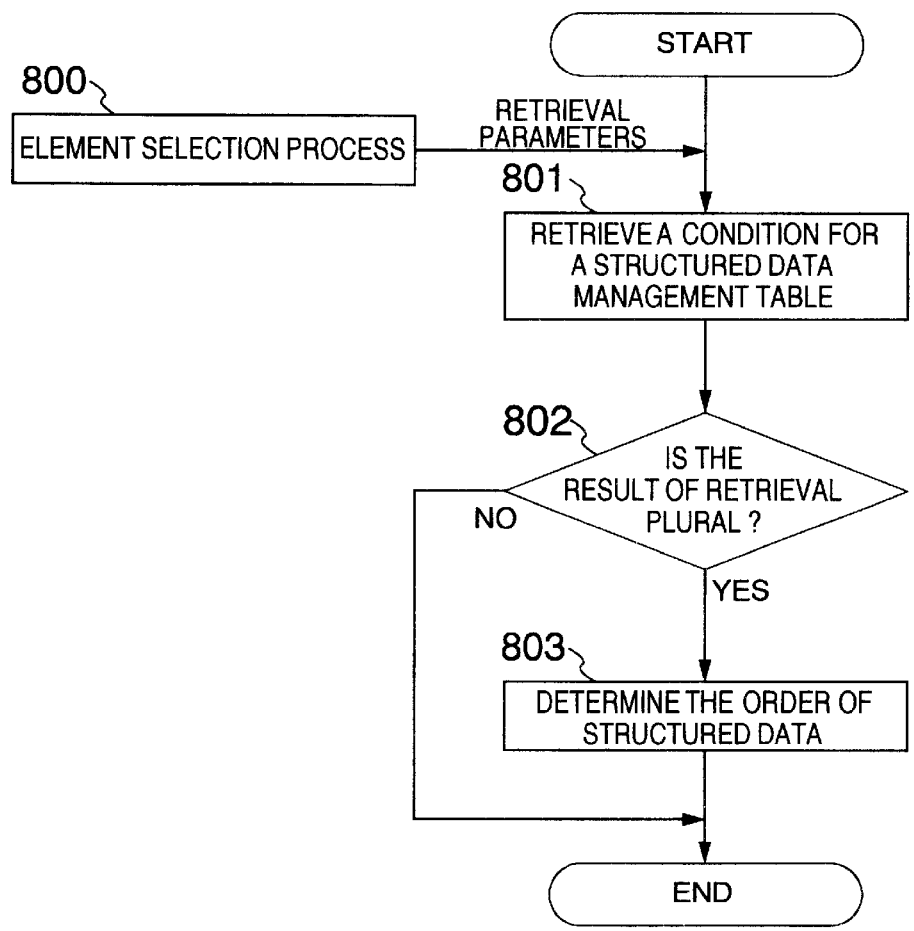
FIG. 8 is a flow chart of a procedure for searching interactively generated structured data.
Figure 9:
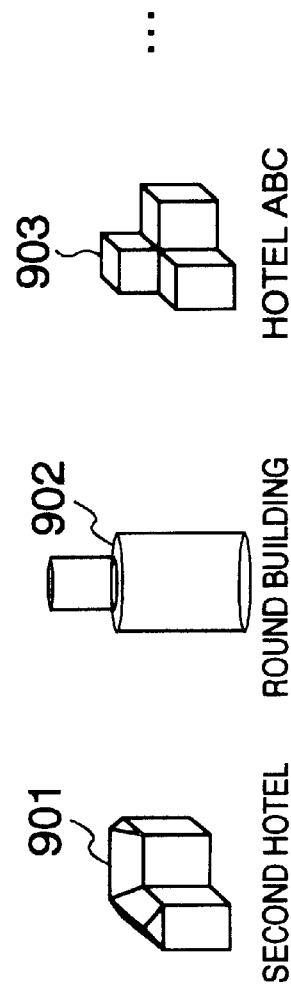
FIG. 9 is a view showing an example of a structured data management table.

The structured data retrieval process 205 will be described below with reference to FIGS. 8 and 9. FIG. 8 is a flow chart showing the structured data retrieval process. In FIG. 8, the reference numerals 801 to 803 designate steps for searching interactively generated structured data for suitable structured data as a substitute for the element selected in the aforementioned element selection process 203. The reference numeral 900 in FIG. 9 designates an example of a structured data management table for managing interactively generated structured data 901, 902 and 903. In the case where the interactively generated structured data are managed by a hard disk in a single PC or UNIX on the basis of the name, the number of floors, the shape of the bottom surface, the area of the bottom surface, the data format and the location information of each structured data, directories and filenames are managed. In the structured data retrieval process, the reference numeral 800 designates the aforementioned element selection process in which retrieval parameters necessary for retrieval of structured data are given. In the step 801, retrieval of a condition for the structured data management table is executed on the basis of the retrieval parameters obtained by the process 800 to obtain a suitable structured data. When a plurality of structured data are obtained as a result of the retrieval in the next step 802, the order of the structured data is determined on the basis of the degree of likeness in attribute at the time of retrieval. When, for example, retrieval is executed with use of the number of floors or the area of the bottom surface as a condition, the structured data are arranged in the order of ascending of the number of floors or the area of the bottom surface on the basis of the retrieval parameter values and the interactively generated structured data. By the aforementioned process, a set of interactively generated structured data as substitutive candidates are obtained.

The reason why the shape of the bottom surface is used as one of retrieval conditions is as follows. It is generally difficult to estimate the arrangement of structured data in virtual three-dimensional space because the flexibility in parallel movement, rotation, etc. is large. In the case of a building, there is however a limitation condition that the bottom surface of the building is restricted by the ground. Accordingly, the shape of the bottom surface is used as one of retrieval conditions.

Figure 10:
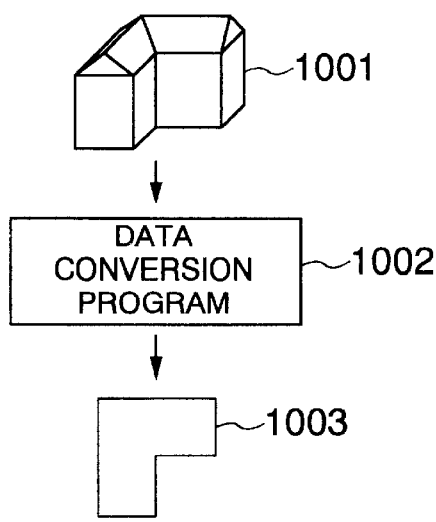
FIG. 10 is a view showing a flow of work in estimation of arrangement of structured data.

The process for obtaining the shape of the bottom surface in the structured data management table from interactively generated structured data will be described in detail. In FIG. 10, the reference numeral 1001 designates interactively generated structured data of a building. A coordinate system is assumed to be set so that the bottom surface forms an x-y plane and the direction of the height of the building forms a z axis. In this system, first, the building structured data 1001 is converted into figure data by a data conversion program 1002. The reference numeral 1003 designates the figure data obtained by conversion. For example, the figure data 1003 corresponds to a top-view contour figure of the building.

Figure 11:
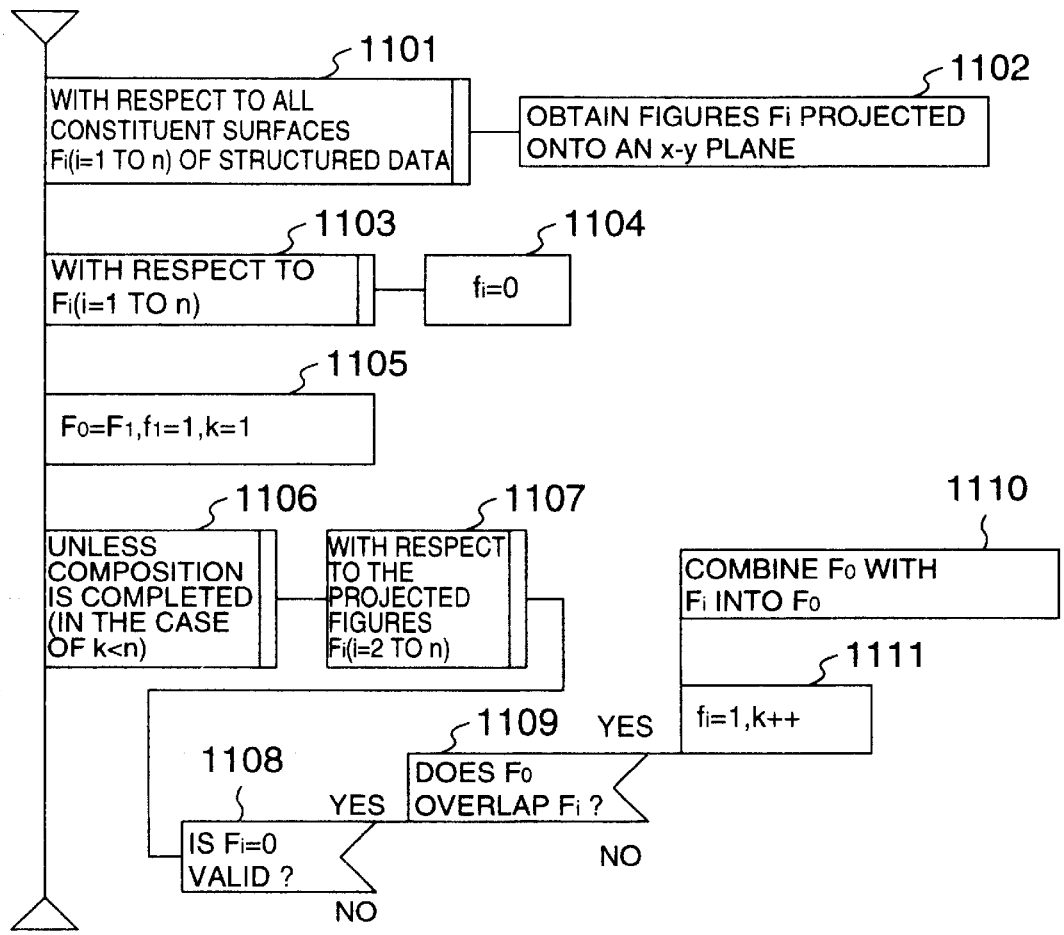
FIG. 11 is a PAD diagram of a data conversion process for converting the figure of a building into a top-view figure.
Figure 12:
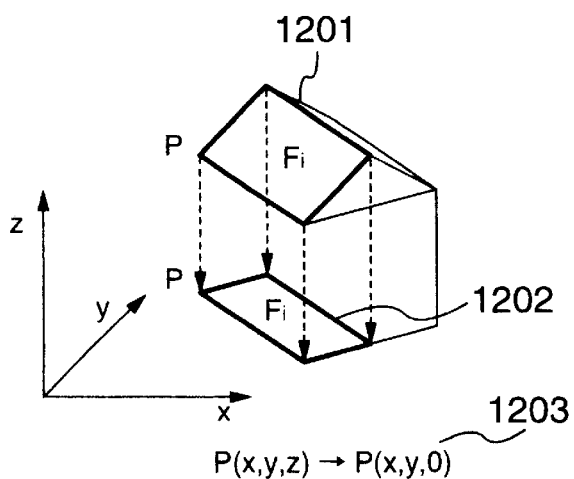
FIG. 12 is a graph for expressing a building as a subject of the data conversion process.

An example of the data conversion program 1002 will be described with reference to FIGS. 11 and 12. FIG. 11 is a PAD diagram showing a flow of work for converting data into a top-view contour figure of the building, and FIG. 12 is a view showing the building as a subject of data conversion.

Incidentally, PAD is one of tree structure charts of the type in which procedures are written in boxes. Special marks are given to boxes of control structures so that such control structures are identified. A repetition structure is represented by a double line, and a box with a double line at its right side, for example, as in the step 1101 in FIG. 11, indicates post-judgment. A selection structure is represented by a box having a notched right side, for example, as in the step 1108 in FIG. 11. A process contained in a structure is developed to right as a lower-rank class and is connected to a higher-rank box by a transverse line extended from the higher-rank box. In one and the same class, processes are executed in descending order.

Referring back to FIG. 11, on the assumption that the structured data of the building is set so that the bottom surface forms an x-y plane and the direction of the height of the building forms a z axis, first, all constituent surfaces are projected onto the x-y plane in steps 1101 and 1102. For example, the constituent surface 1201 is projected as represented by the reference numeral 1202. In this occasion, the coordinate values are converted so that the z component becomes zero as represented by the reference numeral 1203. In steps 1103 to 1111, the thus obtained n projection figures $F_i$ (i=1 to n) are combined to compose a top-view contour figure $F_O$ of the building.

The steps in FIG. 11 will be described. With respect to all projection figures $F_i$ (i=1 to n), corresponding flags $f_i$ are set to zero (steps 1103 and 1104). Here, the flags $f_i$ are set so that each of the flags takes 1 when figure combination is completed and takes 0 when figure combination is not completed. Then, the initial value of figure $F_O$ is set to figure $F_1$, a corresponding flag $f_1$ is set to 1 and the number k of figures subjected to composition is set to 1 (step 1105). Unless composition is wholly completed, that is, unless the number k of figures subjected to composition coincides with the number n of projection figures, the residual projection figures are subjected to composition. With respect to the residual projection figures $F_i$ (i=2 to n), a judgment is made as to whether the figure $F_i$ overlaps the figure $F_O$ or not when a corresponding flag $f_i$ is zero (steps 1106 to 1109). When the figures $F_i$ and $F_O$ overlap each other, the figures $F_i$ and $F_O$ are combined to compose a new figure $F_O$ (step 1110) and a corresponding flag $f_i$ is set to 1 and k is increased by 1 (step 1111).

Figure 13:
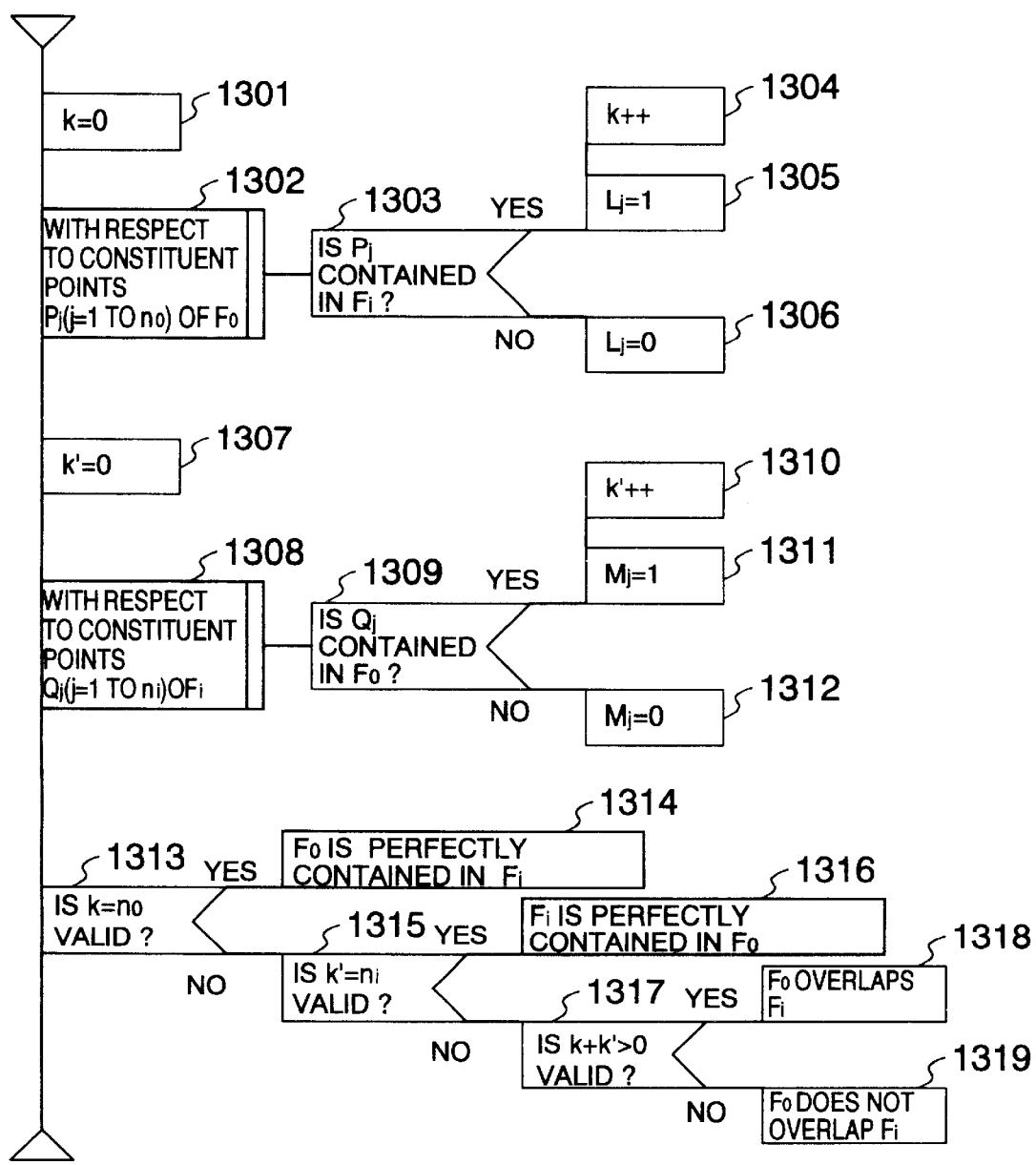
FIG. 13 is a PAD diagram of a process for judging whether two figures overlap each other or not.

The judgment (step 1109) as to whether the figures $F_O$ and $F_i$ overlap each other or not, will be described below with reference to FIG. 13. In FIG. 13, when at least one constituent point in either of the two figures $F_O$ and $F_i$ is contained in the other figure, a decision is made that the two figures $F_O$ and $F_i$ overlap each other.

First, the number k of points which are constituent points of $F_O$ and contained in the figure $F_i$ is set to zero (step 1301). With respect to each of all constituent points $P_j$ (j=1 to $n_O$) of the figure $F_O$, a judgment is made as to whether the point is contained in the figure $F_i$ or not (steps 1302 and 1303).

For example, the judgment as to whether the point $P_j$ is contained in the figure $F_i$ or not, is based on the algorithm that "the number of points of intersection of a semi-infinite line started from the point $P_j$ and respective sides of the figure $F_i$ is examined so that a decision is made that the point $P_j$ is contained in the figure $F_i$ when the number of intersection points is an odd number, and a decision is made that the point $P_j$ is not contained in the figure $F_i$ when the number of intersection points is an even number" as shown in Tsunekawa, "Nano-Pico Classroom Answers: Inside/Outside of Region" (bit, Vol. 15, No. 1, pp. 103–107).

When the point $P_j$ is on a boundary line of the figure $F_i$, the point $P_j$ is regarded as being contained in the figure $F_i$. When the point $P_j$ is contained in the figure $F_i$, k is increased by 1 (step 1304) and corresponding label information $L_j$ is set to 1 (step 1305). Otherwise, $L_j$ is set to 0 (step 1306). Similarly, the number k' of points which are constituent points of the figure $F_i$ and which are contained in the figure $F_O$ is set to 0 (step 1307). With respect to each of all constituent points $Q_j$ (j=1 to $n_i$) of the figure $F_i$, a judgment is made as to whether the point $Q_j$ is contained in the figure $F_O$ or not (steps 1308 and 1309). When the point $Q_j$ is contained in the figure $F_O$, k' is increased by 1 (step 1310) and corresponding label information $M_j$ is set to 1 (step 1311). Otherwise, $M_j$ is set to 0 (step 1312). Finally, a judgment is made as to whether $k=n_O$ is valid or not (step 1313). When $k=n_O$ is valid, a decision is made that the figure $F_O$ is perfectly contained in the figure $F_i$ (step 1314). Otherwise, a judgment is made as to whether $k'=n_i$ is valid or not (step 1315). When $k'=n_i$ is valid, a decision is made that the figure $F_i$ is perfectly contained in the figure $F_O$ (step 1316). Otherwise, a judgment is further made as to whether k+k'>0 is valid or not (step 1317). When k+k'>0 is valid, a decision is made that the figures $F_O$ and $F_i$ overlap each other (step 1318). Otherwise, a decision is made that the figures $F_O$ and $F_i$ do not overlap each other (step 1319).

Figure 14:
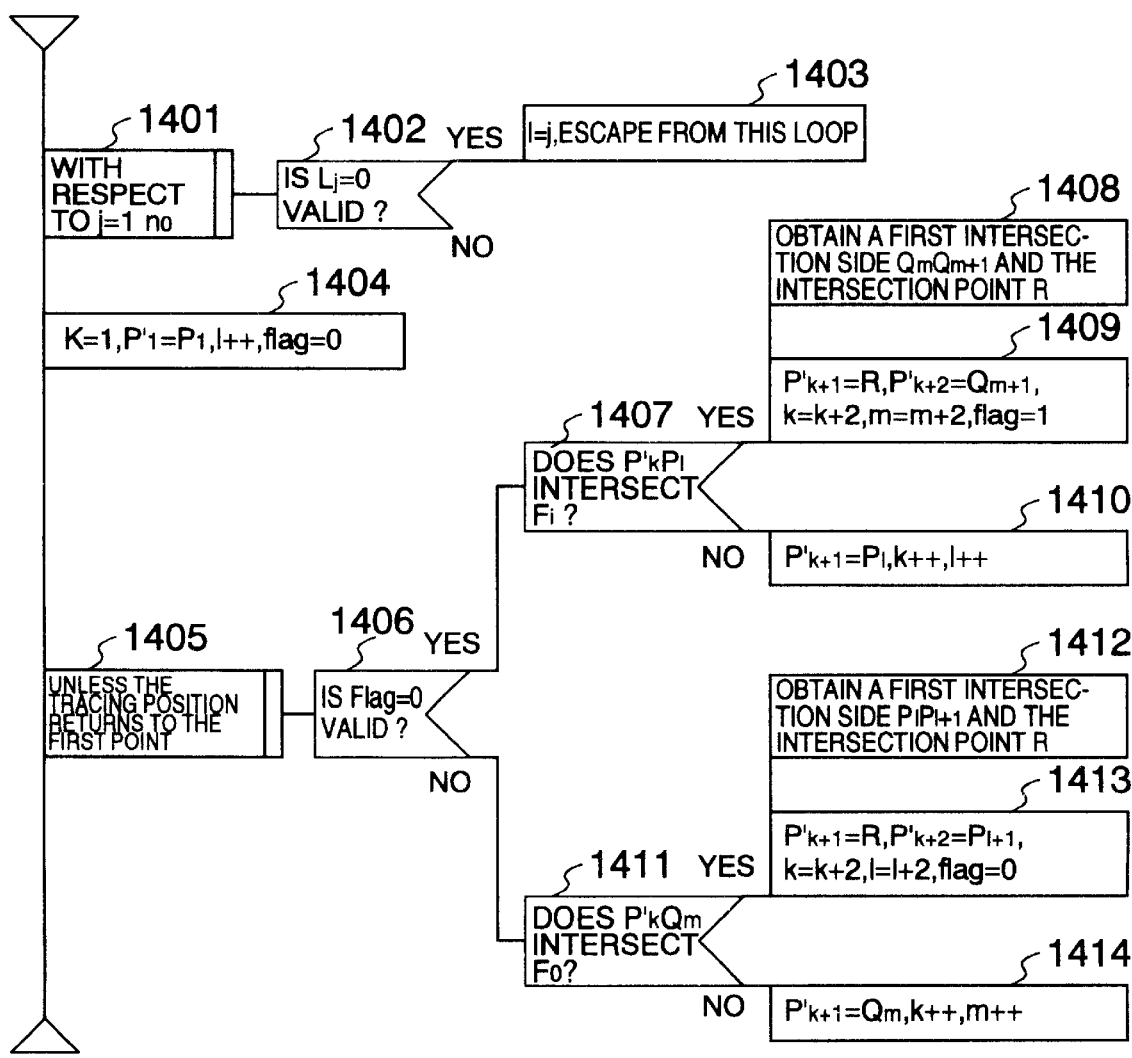
FIG. 14 is a PAD diagram of a process for combining two figures as a composite figure.
Figure 15:
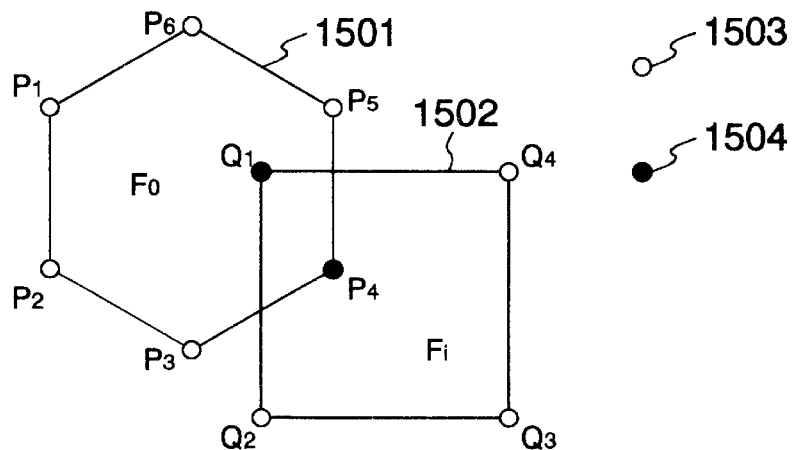
FIG. 15 is a diagram showing two polygons as subjects of composition.

Composition (step 1110) in the case where the figures $F_O$ and $F_i$ overlap each other will be described with reference to FIGS. 14 and 15. FIG. 14 is a PAD diagram showing a flow of this process, and FIG. 15 is a view showing two figures as subjects of composition. Here, a composite figure is obtained by tracing a contour line.

First, in steps 1401 to 1404, a point $P'_1$ of starting of contour line tracing is obtained on the basis of constituent points of the figure $F_O$. Because points contained in the figure $F_i$ are out of the contour line to be obtained, points at which the label information $L_j$ is set to 0 are selected. In FIG. 15, the reference numerals 1501 and 1502 correspond to the figures $F_O$ and $F_i$, respectively, the white dots 1503 show points at which the label information L is 0, and the black dots 1504 show points at which the label information L is 1. It is here assumed that points in each of the polygons are stored in clockwise or counterclockwise order. In FIG. 15, a point $P_1$ is selected as the starting position because the label information L at the point P1 is 0.

In steps 1405 to 1414, the contour line is traced unless the position of tracing returns to the first point. Here, the flag indicates which one of the figures $F_O$ and $F_i$ is being traced. In the case of flag=0, the flag indicates the figure $F_O$ is being traced. Otherwise, the flag indicates the figure $F_i$ is to be traced. In the case of flag=0, first, a judgment is made as to whether the next trace $P'_kP_1$ intersects the figure $F_i$ or not (step 1407).

When the next trace $P'_kP_1$ intersects the figure $F_i$, a side $Q_mQ_{m+i}$ of the figure $F_i$ which intersects $P'_kp_1$ first and the point R of intersection are obtained (step 1408) and the intersection point R and the point $Q_{m+1}$ are added as passing points (step 1409).

When the next trace $P'_kP_1$ does not intersect the figure $F_i$, the point $P_1$ is added as a passing point (step 1410). Also in the case of flag=1, tracing is performed in the aforementioned manner (steps 1411 to 1414).

Figure 16:
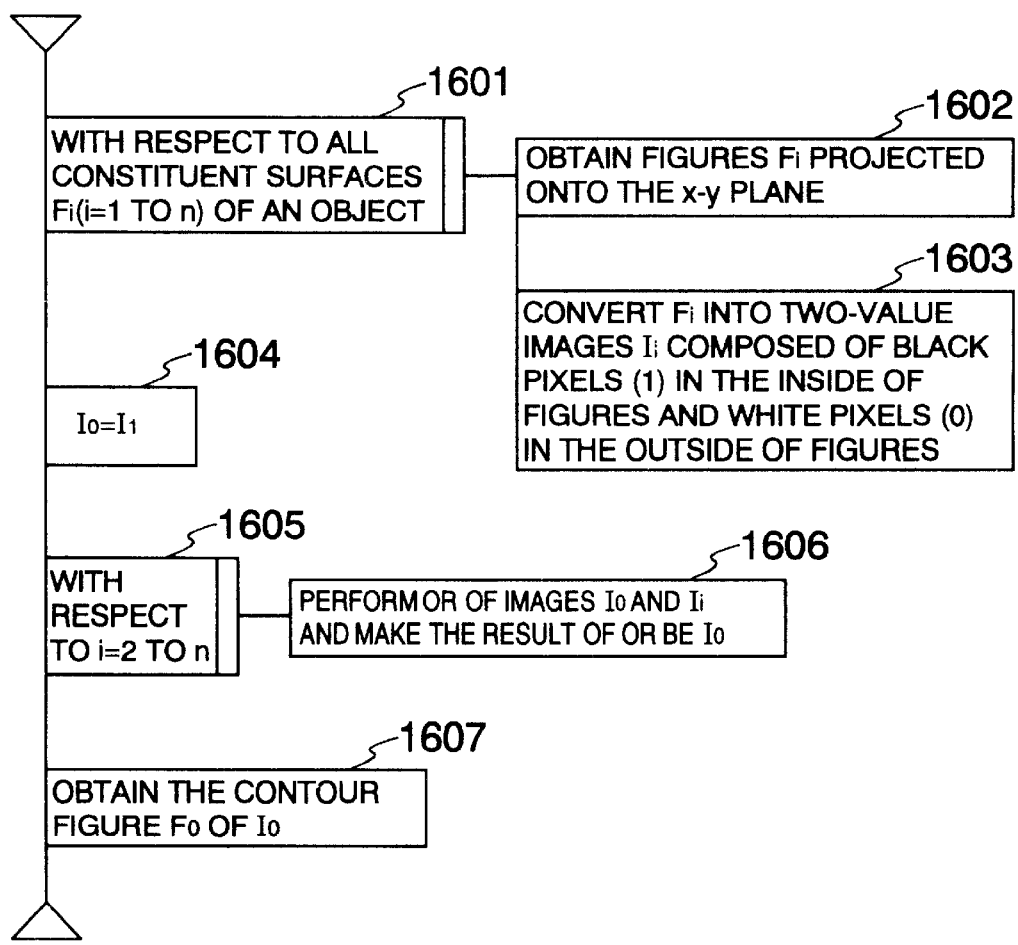
FIG. 16 is a PAD diagram showing another embodiment of the data conversion process.

Although a data conversion method has been described above with reference to FIGS. 11 through 15, the data conversion method is not limited thereto. For example, as shown in FIG. 16, in steps 1601 to 1603, all constituent surfaces of structured data may be projected onto the x-y plane so that the structured data is converted into a two-value image in which the inside of the figure is expressed by black pixels (1) and the outside is expressed by white pixels (0). Then, in steps 1604 to 1606, the thus obtained n images $I_i$ (i=1 to n) are ORed to obtain a composite image $I_O$. Finally, in a step 1607, the contour of the composite image $I_O$ is traced to obtain a contour figure $F_O$.

Figure 18:
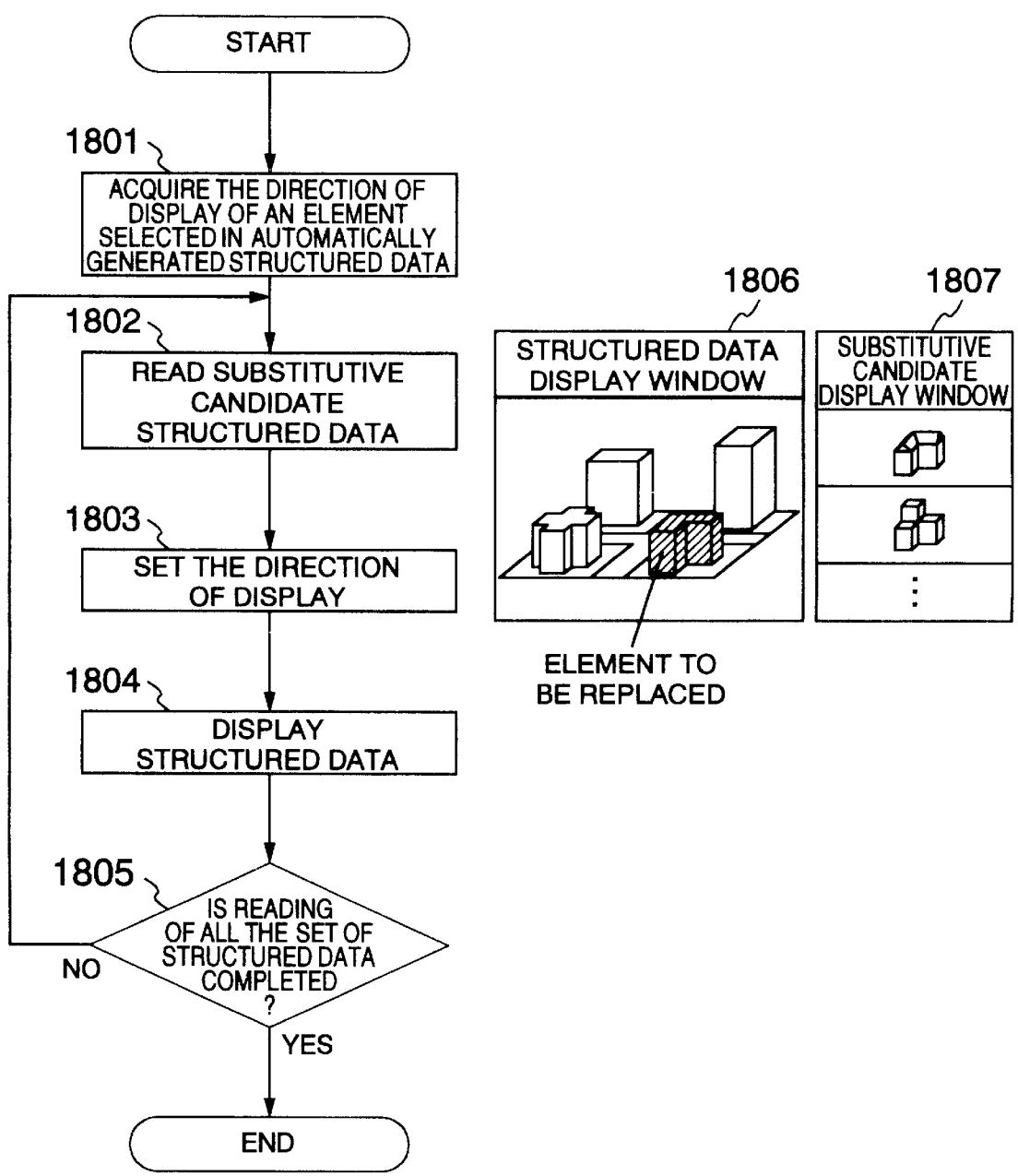
FIG. 18 is a flow chart for explaining a process for displaying a list of structured data interactively generated as substitutive candidates.
Figure 19:
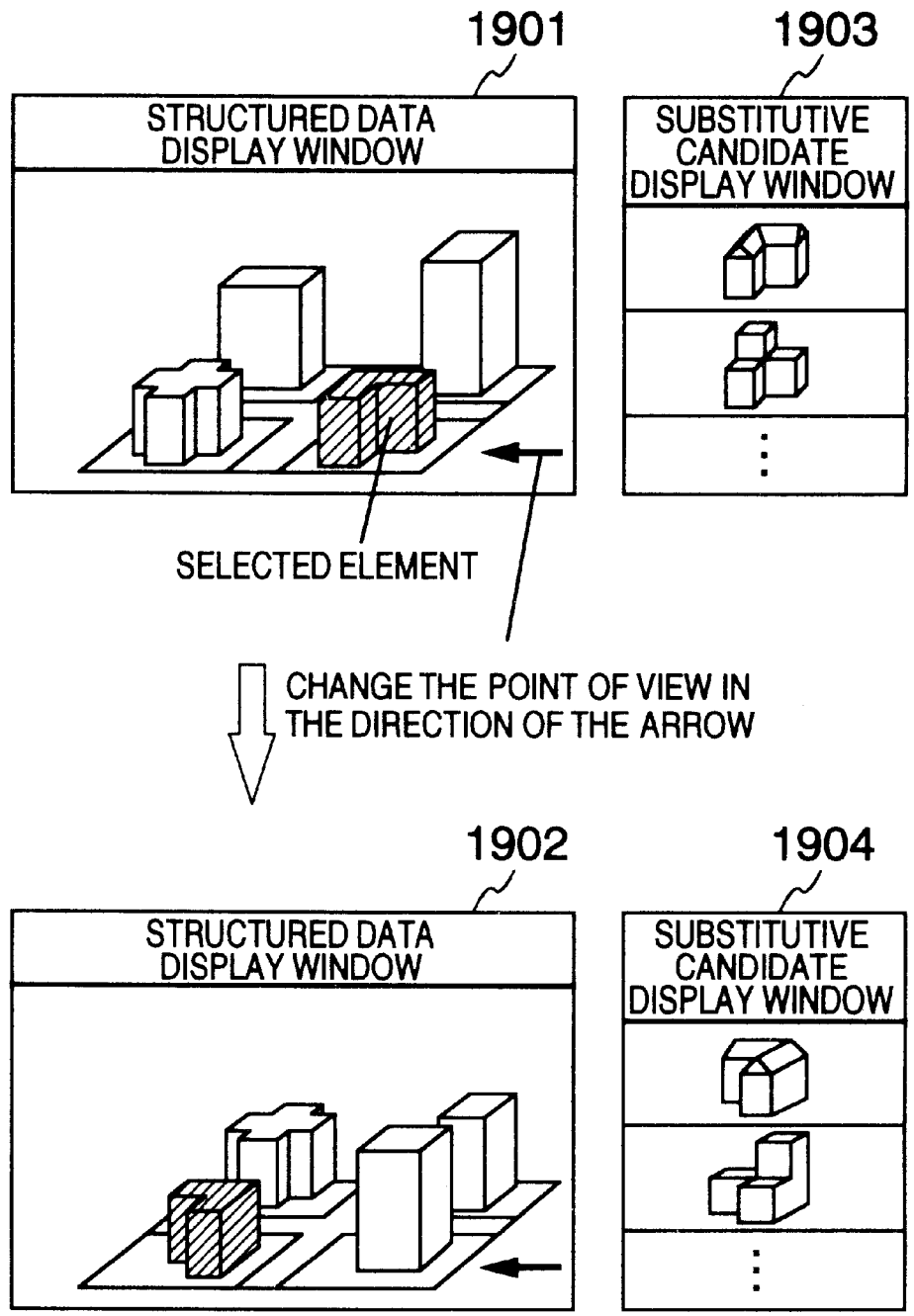
FIG. 19 is a view showing the association of the structured data display window with a substitutive candidate display window.

The steps in FIG. 2 will be described again. The structured data list display process 208 will be described with reference to FIG. 18. FIG. 18 is a view showing a flow of a process for displaying a list of structured data as substitutive candidates and an example of display of a result of the process. In FIG. 18, in a step 1801, the direction of display of the element to be replaced is obtained from the structured data display window 1806. Then, in a step 1802, one interactively generated structured data as a substitutive candidate is read. In a step 1803, the direction of display of structured data is set on the basis of the direction of display obtained in the step 1801. In a step 1804, the structured data is displayed in the substitutive candidate display window. The procedure of from the step 1802 to the step 1804 is repeated by the number of retrieved structured data so that a substitutive candidate display window as designated by the reference numeral 1807 is displayed. As a result of this process according to the present invention, the element selected in the window 1806 and the structured data displayed in the window 1807 are displayed so that the respective shapes of the bottom surfaces thereof are arranged in the same direction as shown in two window examples 1806 and 1807. Further, also in the case where the direction of view in the structured data display window is changed after the substitutive candidate display window is displayed as shown in FIG. 19, the procedure of the steps 1801, 1802, 1803 and 1804 in FIG. 18 is repeated so that the direction of display of structured data displayed in the substitutive candidate display window is changed interlockingly. As described above, when the direction of display of structured data in one window is made coincident with that in the other window, a list of structured data corresponding to various directions of view of automatically generated structured data can be displayed. This is effective for a process of selecting a substitutive candidate.

Figure 20:
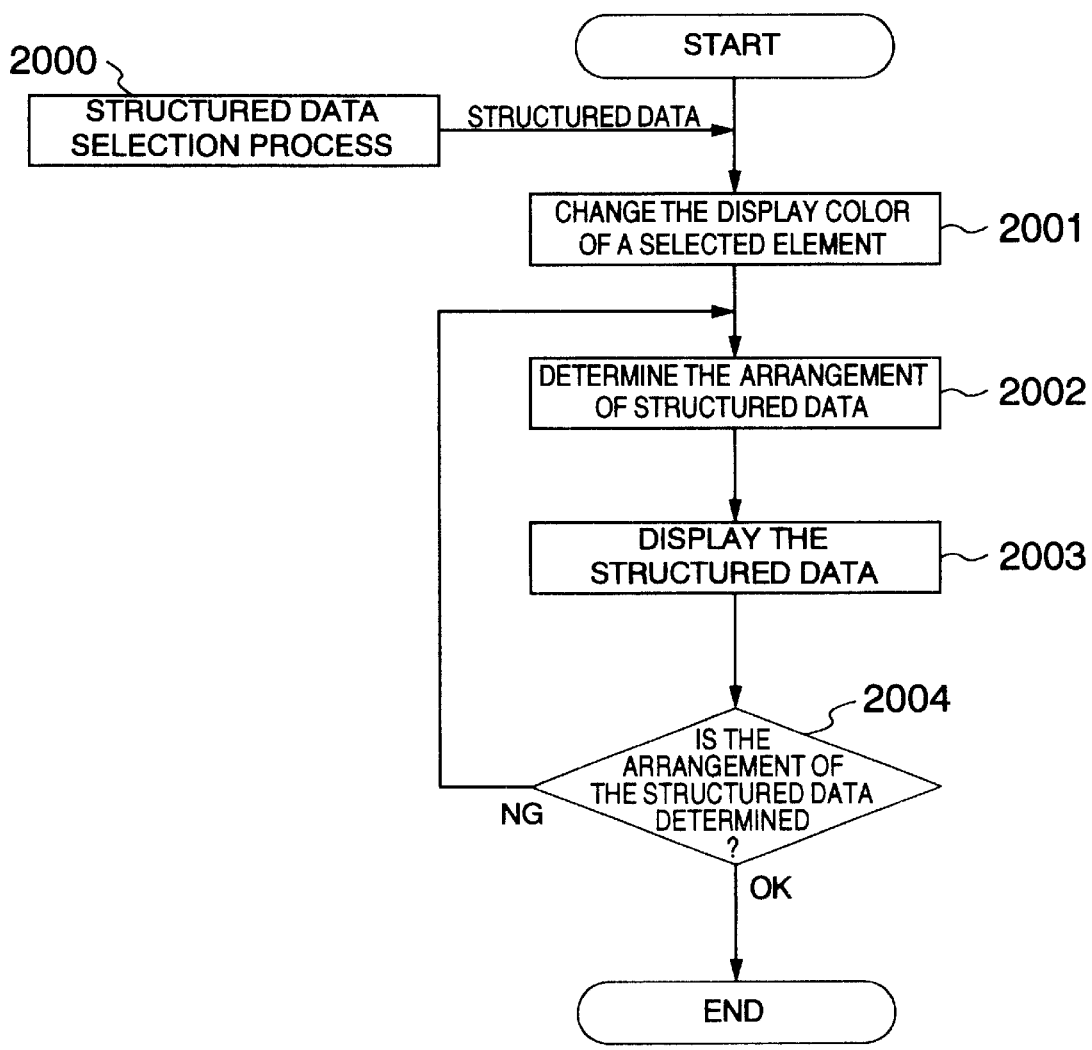
FIG. 20 is a flow chart of a structured data conversion process.

The structured data replacement process 210 will be described below with reference to FIG. 20. FIG. 20 is a flow chart of the structured data replacement process. First, interactively generated structured data to be substituted are obtained in the structured data selection process 2000. Then, in a step 2001, the display color of an element selected as a subject of replacement in the structured data display window is changed to a transparent color. Then, in a step 2002, the arrangement of the structured data to the position of the selected element is determined. Several means may be used for alignment for the determination of the arrangement of the structured data. For example, the area ratio between figures or the coordinates of the respective centers of gravity in figures can be used. In a step 2003, the structured data is displayed in a corresponding position in the structured data display window. In a step 2004, the arrangement is fixed or another arrangement is processed again to obtain the optimum arrangement. In the determination of the arrangement of the structured data, the arrangement is determined uniquely when the structured data to be substituted has a complex shape. When the interactively generated structured data has a symmetric figure such as a cube, a pillar, or the like, there are however several ways of arrangement. Therefore, for example, it is possible to use a method using right and left buttons of a mouse to determine the optimum arrangement such that the interactively generated structured data is rotated to the next candidate when the right button is pushed once while the interactively generated structured data is rotated to the previous candidate when the left button is pushed once. Further, when the interactively generated structured data is shaped like a pillar, it is possible to use an arrangement determination method of designating the angle of rotation. As a result of the aforementioned process, virtual three-dimensional space data are obtained from automatically generated structured data and interactively generated structured data.

Figure 21:
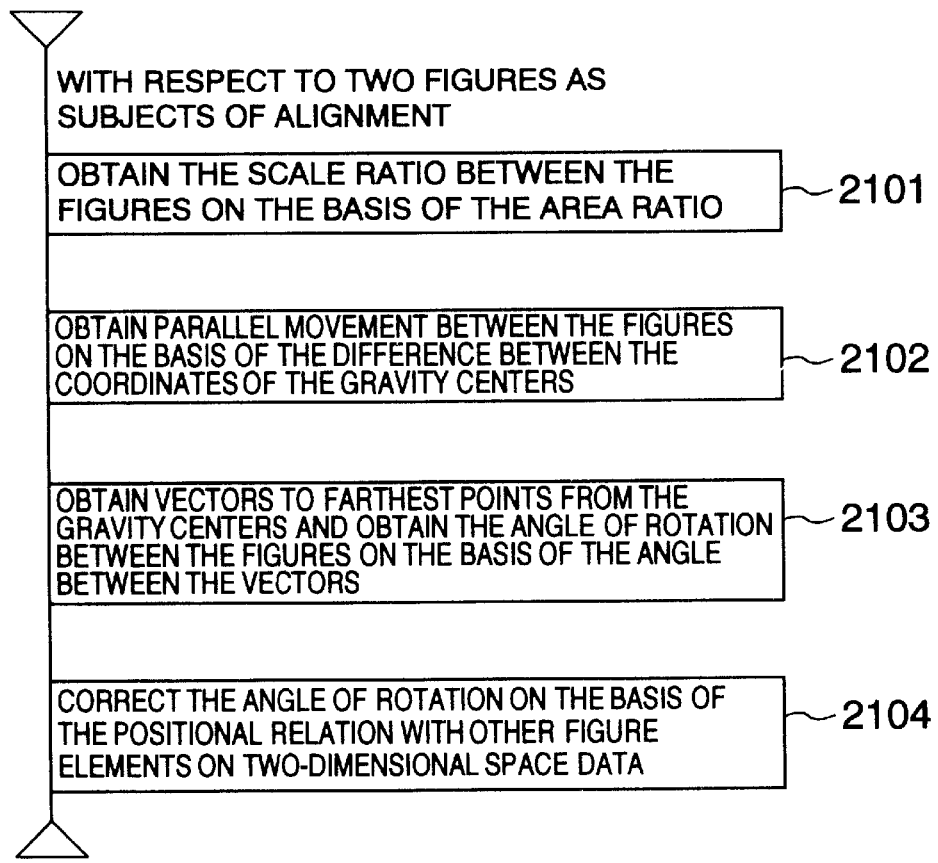
FIG. 21 is a PAD diagram showing a flow of work for alignment of a building.

The method of alignment for the determination of the arrangement of structured data will be described in detail with reference to FIGS. 21 and 22. FIG. 21 is a PAD diagram showing a flow of this process, and FIG. 22 is a view for explaining the alignment method.

Figure 22:
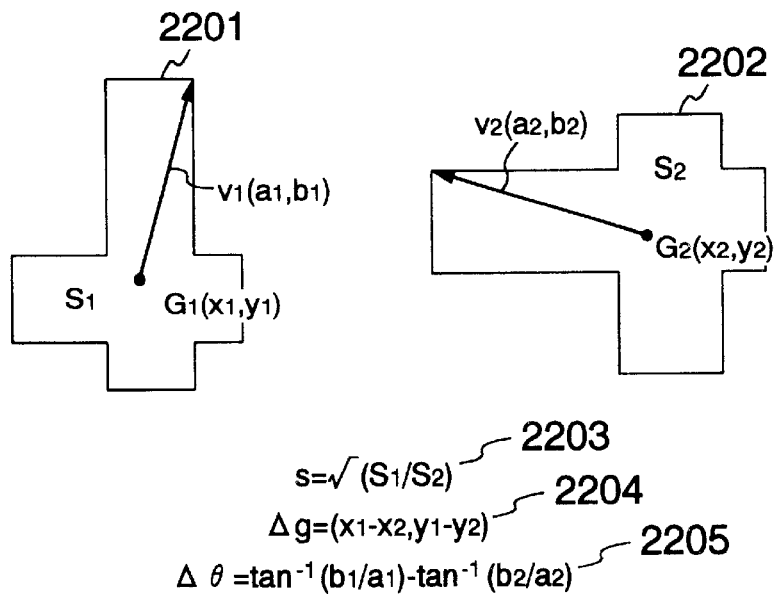
FIG. 22 is a view for explaining a method for aligning a building.

In FIG. 22, the reference numeral 2201 designates a building frame figure on automatically generated structured data as a subject of replacement; and 2202, a top-view contour figure on interactively generated structured data. The origin and coordinate axes in a coordinate system for the building frame FIG. 2201 are made coincident with those in a coordinate system for the contour FIG. 2202.

First, in a step 2101, the scale ratio s is obtained on the basis of the area S1 of the building frame FIG. 2201 and the area $S_2$ of the contour FIG. 2202. The relationship between the areas and the scale ratio is as represented by the reference numeral 2203.

Then, in a step 2102, the quantity Ag of parallel movement is obtained on the basis of the coordinates $(x_1, y_1)$ of the gravity center $G_1$ of the building frame FIG. 2201 and the coordinates $(x_2, Y_2)$ of the gravity center $G_2$ of the contour FIG. 2202. The relationship between the gravity centers and parallel movement is as represented by the reference numeral 2204.

Further, in a step 2103, vectors to farthest points from the gravity centers are obtained as $v_1(a_1, b_1)$ and $v_2(a_2, b_2)$ respectively and the angle $\Delta\theta$ of rotation is obtained on the basis of the vectors. The relationship between the vectors and the angle of rotation is as represented by the reference numeral 2205.

Then, the coordinates of the structured data are transformed on the basis of the scale ratio, the quantity of parallel movement and the angle of rotation to thereby perform alignment.

Because the building frame FIG. 2201 and the contour FIG. 2202 are not strictly coincident with each other, correct arrangement is not always obtained in the steps 2101 to 2103.

On the other hand, the positional relation between figure elements on two-dimensional space data has the regularity that "a building is, in most cases, arranged to be parallel with a road".

Therefore, in a step 2104, the angle of rotation is corrected on the basis of the positional relation between figure elements on two-dimensional space. That is, the position of the building frame FIG. 2201 is corrected on the basis of the positional relation with other figure elements on two-dimensional space and the angle of rotation for the contour FIG. 2202 is further corrected on the basis of the correction of the position of the building frame FIG. 2201.

For storage of virtual three-dimensional space data obtained by this series of steps, interactively generated structured data per se are not stored but positional information indicating arrangement in the automatically generated structured data and location information indicating places of management of the interactively generated structured data are stored as shown in FIG. 23 which shows an example of the virtual three-dimensional space data storage table. In the example of configuration of the virtual three-dimensional space data management table, for example, the figure ID of an element replaced, the directory and filename indicating the location of the interactively generated structured data, the quantities of movement in the X-, Y- and Z-axis directions for indicating the arrangement at the time of replacement and the quantities of rotation around the X, Y and Z axes are stored as shown in FIG. 23. When the automatically generated structured data after the replacement process is to be displayed again, the data is displayed again on the basis of the arrangement information and location information stored in the aforementioned manner.

In this embodiment, a desired interactively generated structured data is retrieved from a set of interactively generated structured data while the shape of the bottom surface, name attribute, height information, or the like, of automatically generated three-dimensional structured data to be replaced by interactively generated structured data is used as a retrieval condition. Accordingly, interactively generated structured data need not be generated by use of a CAD tool, or the like, in accordance with automatically generated three-dimensional structured data as a subject of replacement. Furthermore, manual work for combining automatically generated structured data and interactively generated structured data to compose virtual three-dimensional space can be reduced as extremely as possible.

EMBODIMENT 2

Figure 24:
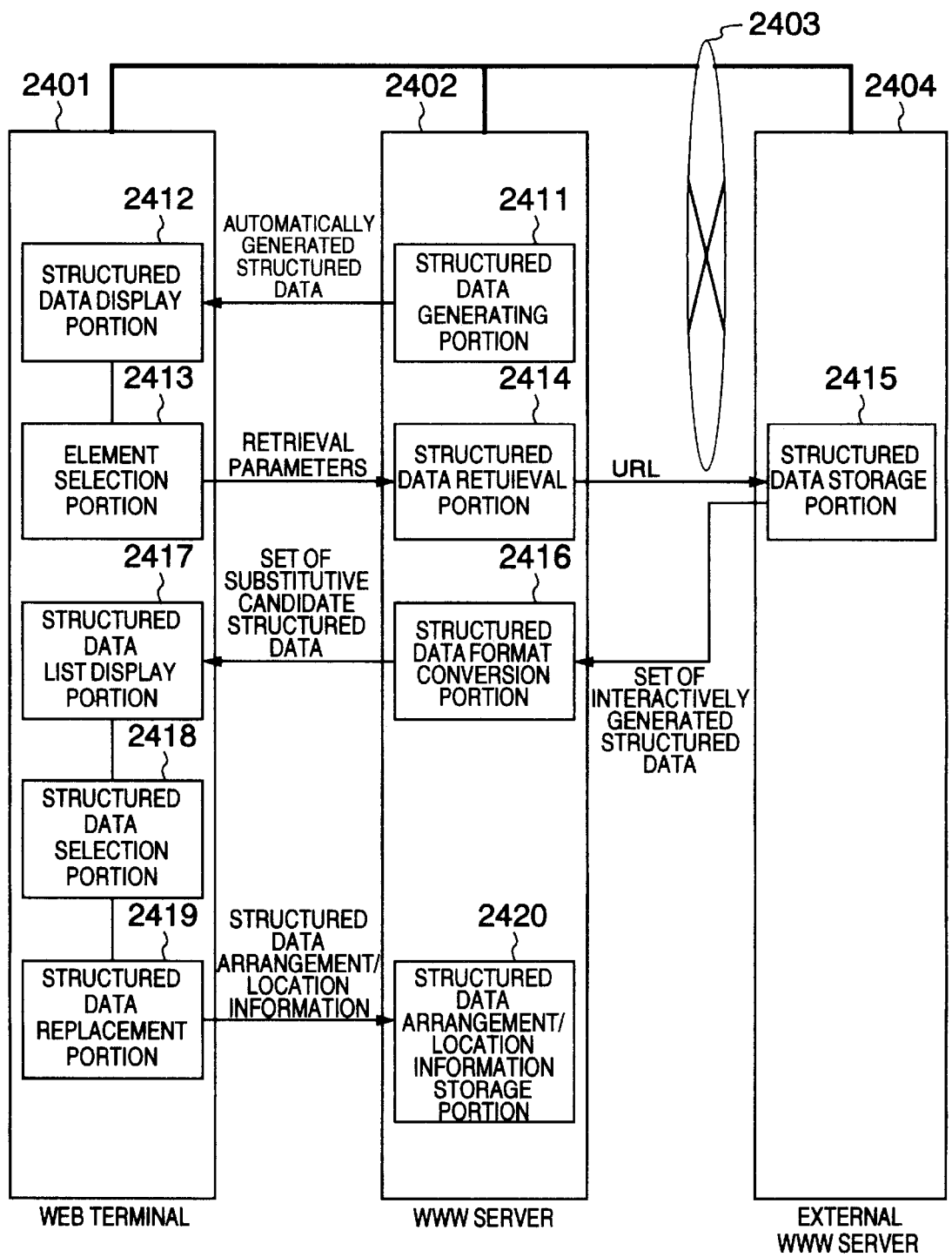
FIG. 24 is a diagram in the case where a virtual three-dimensional space constructing system according to the present invention is formed in a network environment.

An example of achievement of a system constructed under an Internet environment by the virtual three-dimensional space constructing method described above in Embodiment 1 will be described with reference to FIG. 24. FIG. 24 shows a system configuration in the case where the virtual three-dimensional space constructing process according to the present invention is achieved under an Internet environment. This system comprises a Web terminal 2401, a WWW server 2402, a network 2403 such as Internet, Intranet, or the like, and an external WWW server 2404 connected to the network. A structured data display portion 2412, an element selection portion 2413, a structured data list display portion 2417, a structured data selection portion 2418 and a structured data replacement portion 2419 are disposed in the Web terminal 2401. A structured data generating portion 2411, a structured data retrieval portion 2414, a structured data format conversion portion 2416 and a structured data arrangement/location information storage portion 2420 are disposed in the WWW server 2402. A structured data storage portion 2415 is disposed in the external WWW server 2404. The processing portions in FIG. 24 will be described in connection with the flow of processing in FIG. 2. The portions 2412, 2413, 2414, 2416, 2417, 2418, 2419 and 2420 are equivalent to the steps 202, 203, 205, 207, 208, 209, 210 and 212, respectively. To retrieve only necessary structured data selectively from structured data dispersively managed on a network, a table which is extended so that an identifier for uniquely identifying a computer on the network is added to the item of directory/filename in the structured data management table in FIG. 9 is used in the structured data retrieval portion 2414. Similarly, the aforementioned identifier is also managed in the structured data arrangement/location information storage portion 2420 in order to storage the location of structured data.

In this embodiment, necessary interactively generated structured data retrieved in accordance with a retrieval condition such as the shape of the bottom surface, name attribute, height information, or the like, of automatically generated three-dimensional structured data as a subject of replacement by interactively generated structured data are provided from a server. Accordingly, superfluous data need not be stored in the terminal device side, so that resources such as storage devices, etc. can be used effectively.

EMBODIMENT 3

Figure 25:
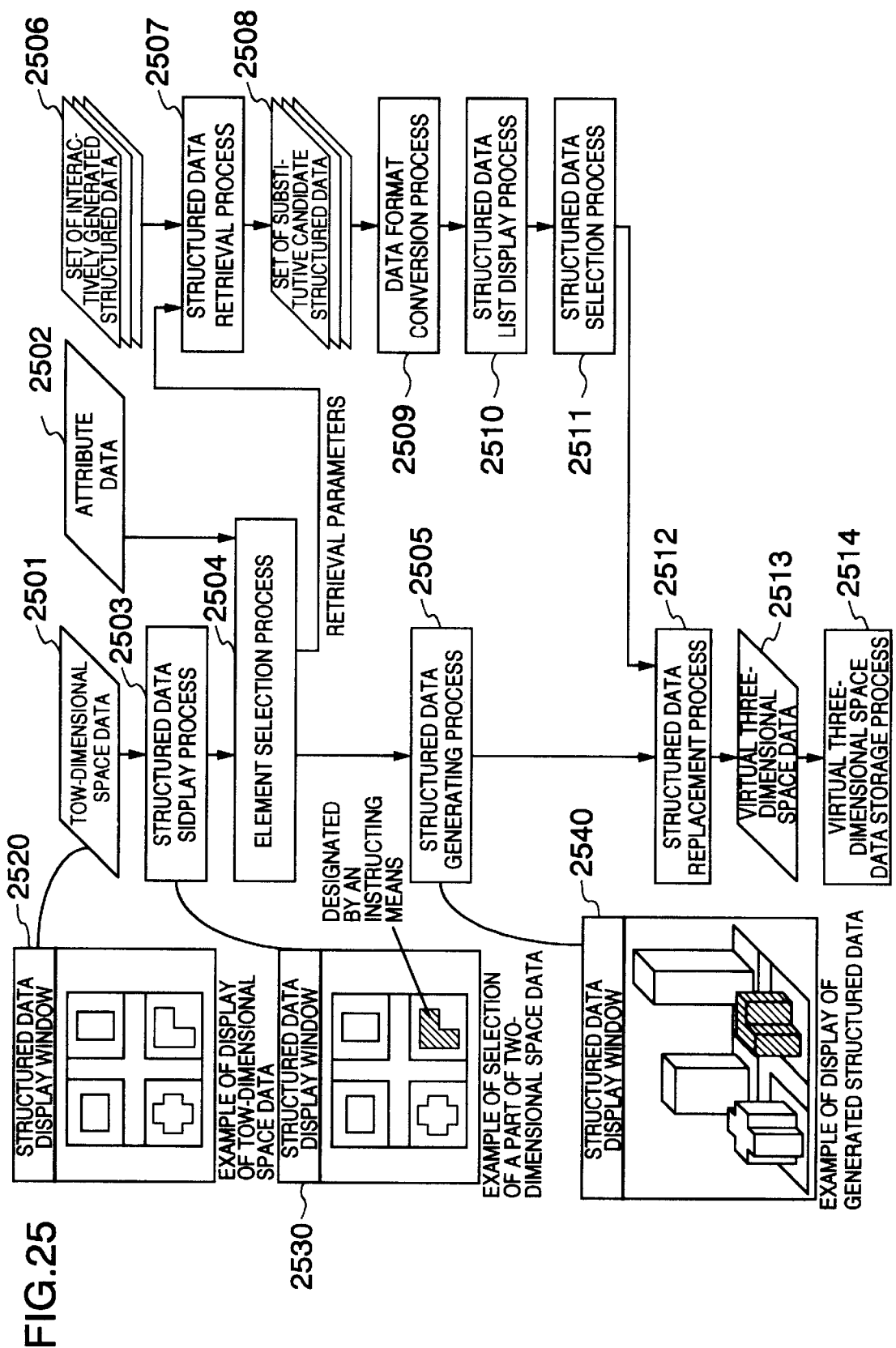
FIG. 25 is a flow chart of work for processing two-dimensional space data, as a subject, in the virtual three-dimensional space constructing method according to the present invention.

Although Embodiments 1 and 2 show the case where structured data generated automatically on the basis of two-dimensional space data and attribute data related to the two-dimensional space data is used as a subject of replacement, the case where two-dimensional space data used for generating the structured data, instead of the automatically generated structured data, is used as a subject of replacement will be described with reference to FIG. 25. The points of difference in the flow of processing from FIG. 2 are that two-dimensional space data 2501 and attribute data 2502 are used instead of the structured data and a structured data generating process 2505 is added. The two-dimensional space data and attribute data used herein are designed so that the attribute data are associated with respective figures of the two-dimensional space data as represented by the reference numerals 301 and 302 in FIG. 3.

The contents of the process 2503 will be described. To display and scroll the two-dimensional space data, the structured data display process 2503 is obedient to the flow of processing shown in FIG. 4. Because of the display of the two-dimensional space data, however, clockwise or counterclockwise rotational display is performed on a structured data display window in the rotation mode of FIG. 5 on the assumption that the rotation axis is a Z axis as an initial value when the right and upward directions on the display window are positive directions of X and Y axes respectively for display as shown in an example of the structured data display window 2520. With respect to parallel movement, the same process for the structured data is performed, that is, movement in the X direction, movement in the Y direction and movement in the Z direction are equivalent to transverse scroll display, longitudinal scroll display and scale-up/scale-down display respectively.

The element selection process 2504 will be described below. In the element selection process 2504, a figure element is designated from the two-dimensional space data as a subject of selection as shown in an example of the structured data display window 2530. In this point, this case is different from the case where three-dimensional structured data is a subject of selection. The contents of processing in this case are however equal to the contents of processing in FIG. 8 which shows the case where structured data is a subject of selection.

Finally, the structured data generating process 2505 added when two-dimensional space data and attribute data are used as subjects of selection will be described. In the structured data generating process 2505, as described above, three-dimensional solids are generated successively on the basis of figure elements in the two-dimensional space data and height information in attribute data associated with the figures, so that three-dimensional structured data as shown in an example of the structured data display window 2540 is generated. Processes after this process are the same as those in the flow of processing in FIG. 2.

By the aforementioned flow of processing, substitution for interactively generated structured data can be performed even in the case where two-dimensional space data and attribute data are used as subjects of replacement.

EMBODIMENT 4

Although Embodiments 1, 2 and 3 are configured from the point of view of retrieving necessary interactively generated structured data from a set of interactively generated structured data, this embodiment will be described about a method for estimating the arrangement of interactively generated structured data in virtual three-dimensional space expressed by two-dimensional space data 301 and attribute data 302.

Figure 26:
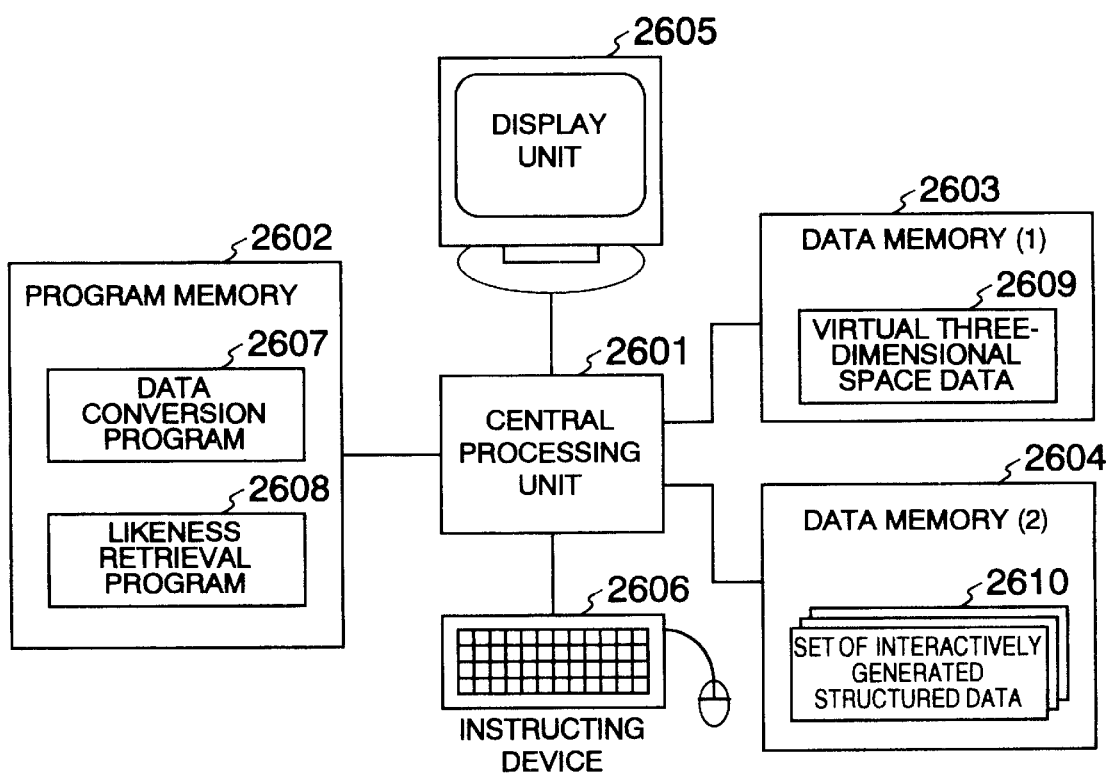
FIG. 26 is a diagram showing a system configuration for estimation of arrangement of structured data interactively generated according to the present invention.

FIG. 26 is a diagram showing a system configuration for estimating the arrangement of structured data according to the present invention.

In FIG. 26, the reference numeral 2601 designates a central processing unit for estimating the arrangement of structured data; and 2602, a program memory for storing programs necessary for processing in the central processing unit 2601.

A data conversion program 2607 for converting structured data into figure data and a likeness retrieval program 2608 for retrieving like figures on virtual three-dimensional space with use of the converted figure data as a retrial condition are stored in the program memory.

The reference numeral 2603 designates a first data memory for storing virtual three-dimensional space data 2609 expressed by two-dimensional space data 301 and attribute data 302; and 2604, a second data memory for storing a set of interactively generated structured data. The reference numeral 2605 designates a display unit for displaying virtual three-dimensional space data as a subject of estimation of arrangement, interactively generated structured data, the course of estimation of arrangement and a result of the estimation; and 2606, an instructing device for performing an instruction to judge whether the result of the estimation is correct or not or to select an arrangement candidate from a plurality of arrangement candidates.

A flow of processing as a whole in the structured data arrangement estimation system in this embodiment will be described below.

In this system, first, interactively generated structured data are converted into figure data by the data conversion program 2607 in the same manner as in the flow of processing shown in FIG. 10. For example, the figure data correspond to top-view contour figures of buildings.

Then, like figures are retrieved from the two-dimensional space data with use of the aforementioned figure data as a retrieval condition.

The flow of processing in the data conversion program 2607 is the same as the flow of processing described above with reference to FIGS. 11 through 15 or the flow of processing described above with reference to FIG. 16.

A display interface in the system according to the present invention will be described below with reference to FIG. 27.

Figure 27:
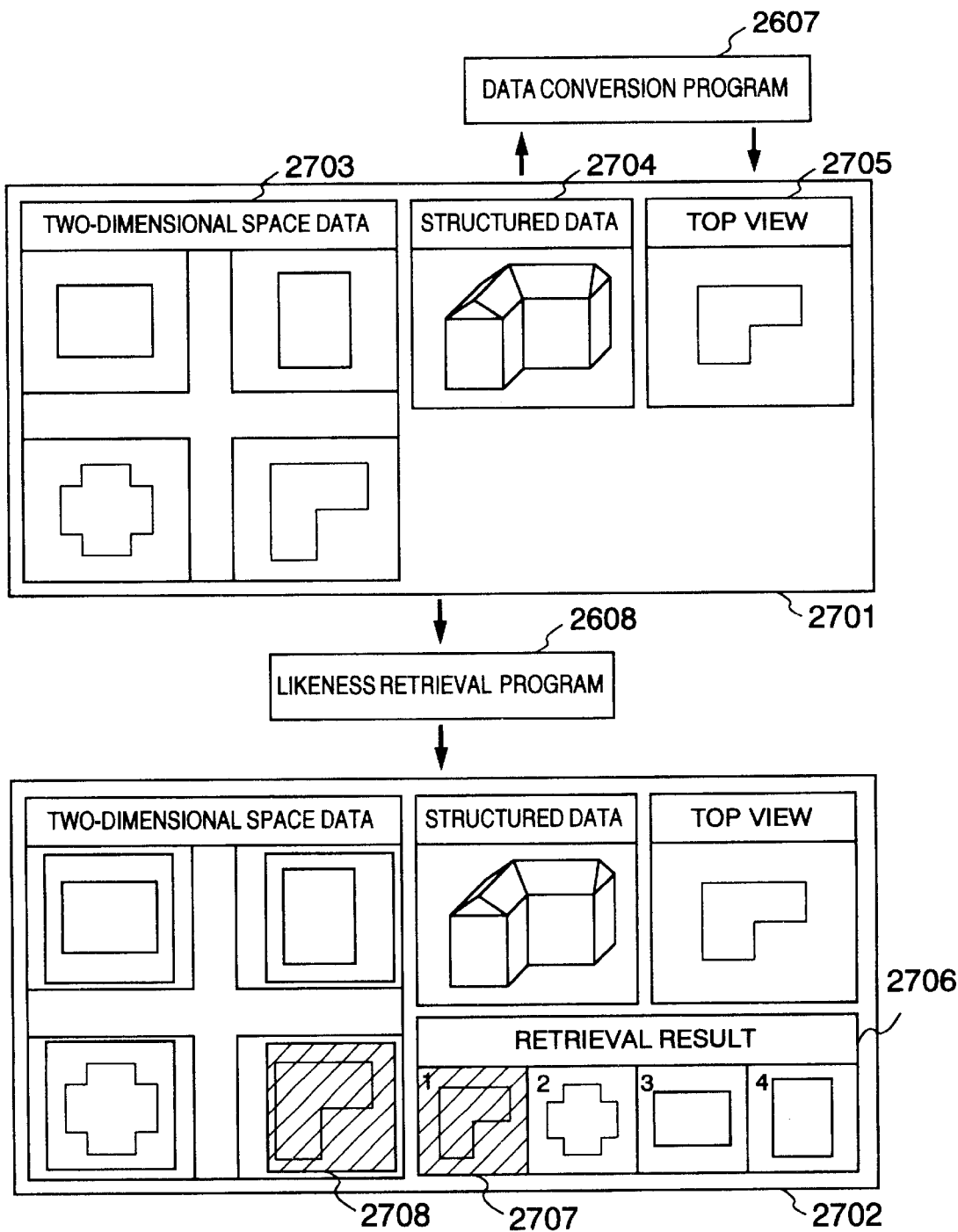
FIG. 27 is a view for explaining the direction of display of a retrieval result based on a likeness retrieval program.
Figure 28:
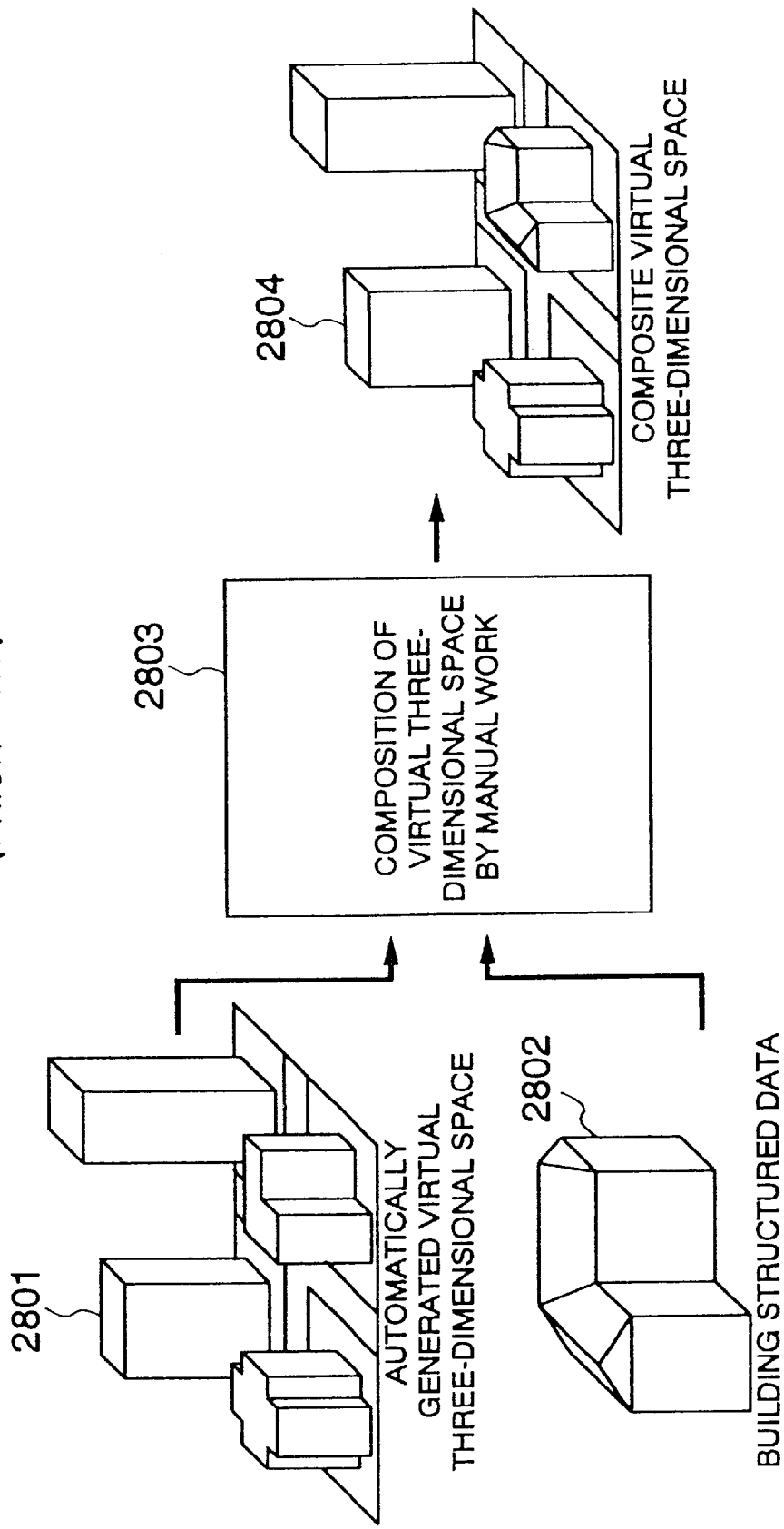
FIG. 28 is a diagram showing a flow of manual work for combining detailed three-dimensional structured data with automatically generated virtual three-dimensional space to generate composite virtual three-dimensional space.

In FIG. 27, the reference numeral 2701 designates a scene before execution of the likeness retrieval program 2608; and 2702, a scene after execution of the likeness retrieval program 2608.

The reference numeral 2703 designates a window for displaying two-dimensional space data such as vector map information, etc.; 2704, a window for displaying interactively generated structured data; and 2705, a window for displaying a top-view contour figure of the interactively generated structured data 2704. A result of execution of the data conversion program 2607 is displayed in the window 2705.

The reference numeral 2706 designates a window for displaying the result of retrieval of like figures from the two-dimensional space data 2703 with the contour FIG. 2705 as a retrieval condition. A plurality of results of retrieval are displayed as a list in this window 2706 in the order of the degree of likeness described above.

Here, the retrieval results 2706 are associated with figures on two-dimensional space data 2703 respectively. When a figure for arranging the contour FIG. 2705 is selected from the figures as retrieval results and designated, the designated FIG. 2707 and a corresponding FIG. 2708 on two-dimensional space data are marked. The operator confirms a figure to be arranged as the contour FIG. 2705 while observing figures, by eyes, on the two-dimensional space data 2703 and issues an instruction to select this figure.

When figures on two-dimensional space data are associated with building structured data as described above, the process of alignment of a building is performed. This process is the same as the process described above with reference to FIGS. 21 and 22.

Although the above description has been made about the case where virtual three-dimensional space data is composed of two-dimensional space data and attribute data, the invention may be applied also to the case where the virtual three-dimensional space data further contains interactively generated structured data. In the case, two-dimensional space data can be generated from virtual three-dimensional space data in the same manner as in the case where structured data are converted into top-view figure data by the aforementioned data conversion program. When the arrangement of structured data is estimated, the two-dimensional space data may be used as an input of the likeness retrieval program.

In this embodiment, the arrangement of structured data in virtual three-dimensional space can be estimated. When automatically generated virtual three-dimensional space data and interactively generated structured data are combined to form composite data, enormous labor required for alignment can be reduced.

Embodiments of the present invention have been described above.

According to the present invention, automatically generated structured data can be replaced by interactively generated structured data easily. Accordingly, enormous labor required for constructing virtual three-dimensional space from automatically generated structured data and interactively generated structured data can be reduced.

We claim:

1. A method for generating virtual three-dimensional space comprising the steps of:

displaying a plurality of rough three-dimensional structured data, each expressing a shape of an object in a polygon pillar, on a display means;

selecting one rough three-dimensional structured data from said plurality of rough three-dimensional structured data displayed on said display means in accordance with a request given by an input means;

retrieving a detailed three-dimensional structured data corresponding to said selected rough three-dimensional structured data from a set of detailed three-dimensional structured data which are stored in a storage unit and each of which expresses a shape of an object in detail;

replacing said selected rough three-dimensional structured data by said corresponding detailed three-dimensional structured data;

displaying a plurality of detailed three-dimensional structured data corresponding to said selected rough three-dimensional structured data on said display means;

selecting one detailed three-dimensional structured data from said plurality of detailed three-dimensional structured data displayed on said display means in accordance with a request given by said input means; and replacing said selected rough three-dimensional structured data by said selected detailed three-dimensional structured data.

2. A method for generating virtual three-dimensional space according to claim 2, further comprising the step of changing a color of a display region of said selected rough three-dimensional structured data.

3. A method for generating virtual three-dimensional space according to claim 2, wherein said set of detailed three-dimensional structured data are searched by use of a shape of a bottom surface of said selected rough three-dimensional structured data as a retrieval condition.

4. A method for generating virtual three-dimensional space according to claim 2, wherein said set of detailed three-dimensional structured data are searched by use of a name attribute of said selected rough three-dimensional structured data as a retrieval condition.

5. A method for generating virtual three-dimensional space according to claim 2, wherein said set of detailed three-dimensional structured data are searched by use of height information of said selected rough three-dimensional structured data as a retrieval condition.

6. A method for generating virtual three-dimensional space according to claim 1, further comprising the step of displaying said plurality of corresponding detailed three-dimensional structured data as a list orderly on the basis of the degree of likeness to the shape of said selected rough three-dimensional structured data.

7. A method for generating virtual three-dimensional space according to claim 1, further comprising the step of displaying said plurality of corresponding detailed three-dimensional structured data on said display means in a manner so that a direction of view for said detailed three-dimensional structured data is made coincident with a direction of view for said selected rough three-dimensional structured data.

8. A method for generating virtual three-dimensional space according to claim 7, further comprising the steps of:

calculating correspondence between the shape of the bottom surface of said selected rough three-dimensional structured data and the shape of the bottom surface of each of said plurality of corresponding detailed three-dimensional structured data; and determining a direction of display for said plurality of corresponding detailed three-dimensional structured data in accordance with said correspondence.

9. A method for generating virtual three-dimensional space according to claim 2, further comprising the steps of:

changing a color of a display region of said selected rough three-dimensional structured data to a transparent color; and displaying said corresponding detailed three-dimensional structured data so as to be superimposed on said rough three-dimensional structured data with its color changed to said transparent color.

10. A method for generating virtual three-dimensional space according to claim 2, further comprising the step of determining a direction of arrangement of said corresponding detailed three-dimensional structured data by changing a direction of arrangement successively in accordance with requests given by said input means when there are a plurality of candidates for the direction of arrangement.

11. A method for generating virtual three-dimensional space according to claim 2, further comprising a step in which, when virtual three-dimensional space data containing said corresponding detailed three-dimensional structured data substituted for said selected rough three-dimensional structured data are stored in a storage unit, location information of said corresponding detailed three-dimensional structured data in said storage unit is stored together with a direction of arrangement of said corresponding detailed three-dimensional structured data.

12. A method for generating virtual three-dimensional space, comprising the steps of;

displaying two-dimensional space data expressing a plurality of objects in two-dimensional shapes on a display means;

selecting one object from said two-dimensional space data displayed on said display means in accordance with a request given by an input means;

retrieving a detailed three-dimensional structured data corresponding to a two-dimensional shape of said selected object from a set of detailed three-dimensional structured data which are stored in a storage unit and each of which expresses a shape of an object in detail, wherein the step of retrievinig a detailed three-dimensional structured data is carried out by projecting constituent surfaces of said detailed three-dimensional figure data onto a plane parallel to a bottom surface thereof, composing all projected figures to obtain a contour figure and comparing said contour figure with said two-dimensional shape; and replacing said selected object by said corresponding detailed three-dimensional structured data.

13. A computer readable memory medium storing a program to perform method steps for generating virtual three-dimensional space, said method steps comprising:

displaying a plurality of rough three-dimensional structured data, each expressing the shape of an object in a polygon pillar, on a display means;

selecting one rough three-dimensional structured data from said plurality of rough three-dimensional structured data displayed on said display means in accordance with a request given by an input means;

retrieving a detailed three-dimensional structured data corresponding to said selected rough three-dimensional structured data from a set of detailed three-dimensional structured data which are stored in a storage unit and each of which expresses a shape of an object in detail;

replacing said selected rough three-dimensional structured data by said corresponding detailed three-dimensional structured data;

displaying a plurality of detailed three-dimensional structured data corresponding to said selected rough three-dimensional structured data on said display means;

selecting one detailed three-dimensional structured data from said plurality of detailed three-dimensional structured data displayed on said display means in accordance with a request given by said input means; and replacing said selected rough three-dimensional structured data by said selected detailed three-dimensional structured data.

14. A method for generating virtual three-dimensional space at a terminal device with communicating with a server comprising the steps of:

displaying a plurality of rough three-dimensional structured data, each expressing the shape of an object in a polygonal pillar, on a display means in said terminal device;

selecting one rough three-dimensional structured data from said plurality of rough three-dimensional structured data displayed on said display means in said terminal device;

transmitting a retrieval condition from said terminal device to said server to retrieve detailed three-dimensional structured data expressing a shape of an object in detail correspondingly to said selected rough three-dimensional structure data;

retrieving a set of detailed three-dimensional structured data, which are stored in a storage unit in said server and each of which expresses a shape of an object in detail, in said server in accordance with said retrieval condition;

transmitting said detailed three-dimensional structured data from said server to said terminal device, in accordance with said retrieval condition; and replacing said selected rough three-dimensional structured data by said detailed three-dimensional structured data transmitted from said server, in said terminal device, wherein a shape of a bottom surface of said rough three-dimensional structured data, a name attribute of said rough three-dimensional structured data or height information of said rough three-dimensional structured data is transmitted, as said retrieval condition, from said terminal device to said server.

15. A method for generating virtual three-dimensional space according to claim 22, further comprising the step of displaying a plurality of objects as a list in the descending order of the degree of likeness to select a corresponding object in accordance with a request given by an input means when the extracted objects are plural in number.

16. A method for generating virtual three-dimensional space comprising the steps of:

converting detailed three-dimensional structured data, each of which expresses a shape of a object in detail, into two-dimensional figure data;

retrieving an object having a shape analogous to a shape of the thus obtained two-dimensional figure data from two-dimensional space data expressing a plurality of objects in two-dimensional shapes; and arranging said detailed three-dimensional structured data in a region in which the extracted object is displayed, wherein, in conversion of said detailed three-dimensional structured data into said two-dimensional figure data, constituent surfaces of said detailed three-dimensional structured data are projected onto a plane parallel with the bottom surface and all projected figures thus obtained are combined to compose a contour figure.

17. A method for generating virtual three-dimensional space according to claim 22, further comprising the step of combining said projected figures to compose said contour figure by tracing the contour routes of the respective figures.

18. A method for generating virtual three-dimensional space according to claim 16, further comprising the step of converting said figure data into two-value image data by painting the inside of each of said figures and taking OR of said two-value image data to thereby compose said contour figure when said projected figures are to be composed.

19. A method for generating virtual three-dimensional space according to claim 22, wherein, when said detailed three-dimensional structured data is arranged in a region in which said extracted object is displayed, an inter-figure scale ratio is obtained on the basis of an area ratio between two kinds of data, that is, between the two-dimensional figure data obtained by said conversion and the data corresponding to said extracted object in said two-dimensional space data, an inter-figure parallel movement quantity is obtained on the basis of a difference between the coordinates of the centers of gravity in said two kinds of data, and an inter-figure rotation angle on the basis of the angle between vectors from the centers of gravity to the farthest points in said two kinds of data, whereby alignment is performed by coordinate transformation of structured data on the basis of the scale ratio, the quantity of parallel movement and the rotation angle.

20. A method for generating virtual three-dimensional space according to claim 19, wherein, when said detailed three-dimensional structured data are data of a building and said two-dimensional space data are data of map, said building data is positioned so that said building becomes parallel with a road in said map data.

* * * * *